United States Patent [19]

Sato et al.

[11] Patent Number: 5,079,583
[45] Date of Patent: Jan. 7, 1992

[54] SHUTTER APPARATUS WHICH ALSO SERVES AS A DIAPHRAGM

[75] Inventors: Yoshinobu Sato, Yokohama; Kazuhiro Matsunaga, Kawasaki, both of Japan

[73] Assignee: Canon Kabushiki Kaisha, Tokyo, Japan

[21] Appl. No.: 575,311

[22] Filed: Aug. 30, 1990

[30] Foreign Application Priority Data

Aug. 31, 1989 [JP] Japan ............................ 1-225788
Aug. 31, 1989 [JP] Japan ............................ 1-225789
Aug. 31, 1989 [JP] Japan ............................ 1-225790

[51] Int. Cl.⁵ ............................................. G03B 7/26
[52] U.S. Cl. .................................... 354/435; 354/484
[58] Field of Search ............................ 354/435, 484

[56] References Cited

U.S. PATENT DOCUMENTS

| | | | |
|---|---|---|---|
| 4,037,236 | 7/1977 | Numata et al. | 354/484 |
| 4,643,558 | 2/1987 | Hasegawa | 354/484 |
| 4,645,326 | 2/1987 | Kiuchi et al. | 354/484 |
| 4,922,283 | 5/1990 | Fukui | 354/484 |
| 4,931,824 | 6/1990 | Takahashi | 354/484 |

*Primary Examiner*—Russell E. Adams
*Attorney, Agent, or Firm*—Robin, Blecker, Daley & Driscoll

[57] ABSTRACT

This invention relates to a shutter apparatus which also serves as a diaphragm. In this invention, there are provided two drive control modes for the shutter apparatus; the first mode for controlling a control voltage to be supplied to a shutter driving motor and the second mode for controlling the duty of a voltage to be applied to the motor. These two modes are switched according to factors such as a power source voltage, whereby optimum shutter control is implemented.

23 Claims, 17 Drawing Sheets

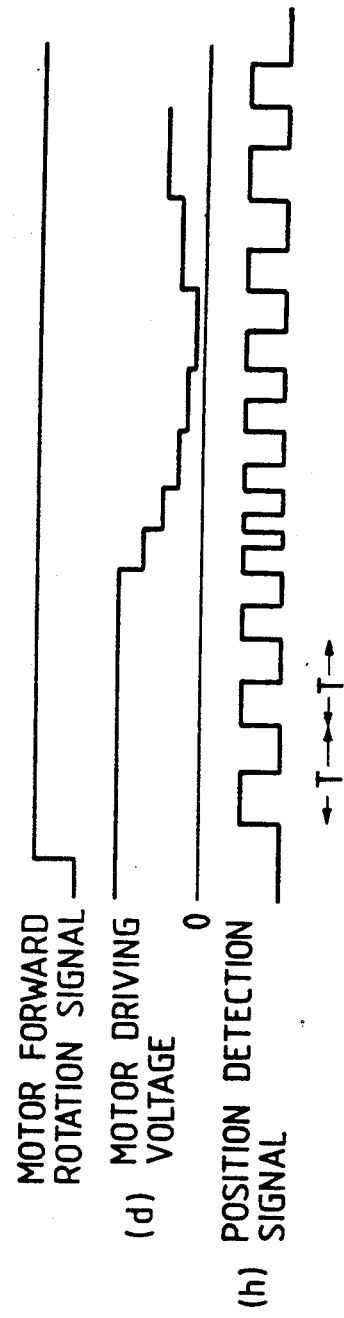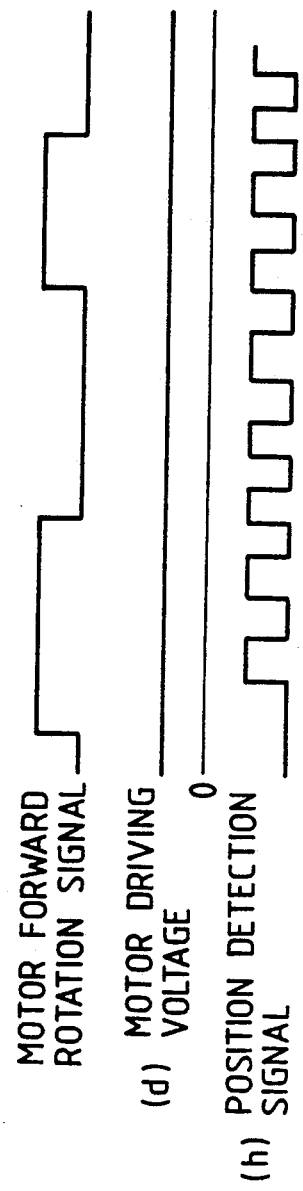

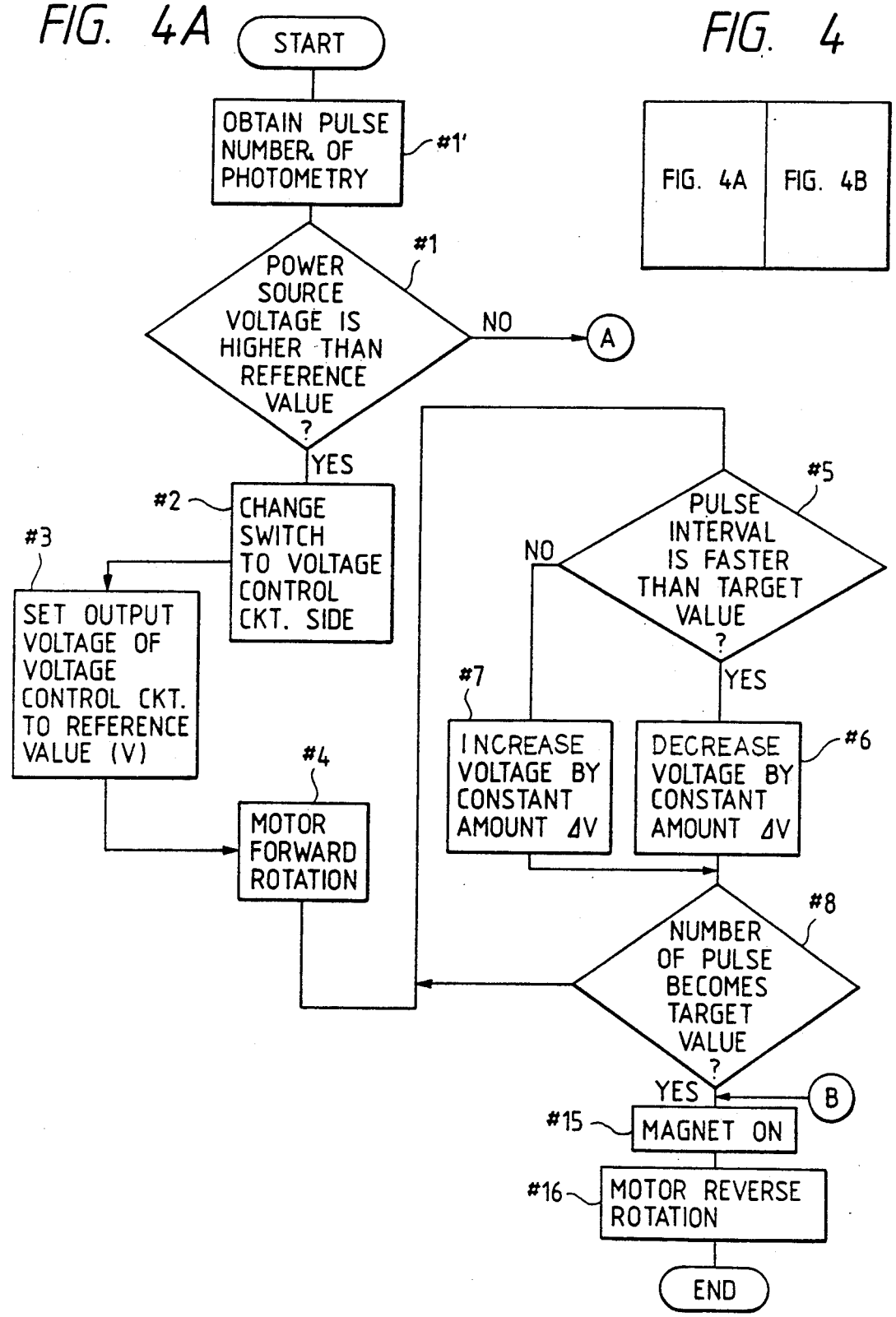

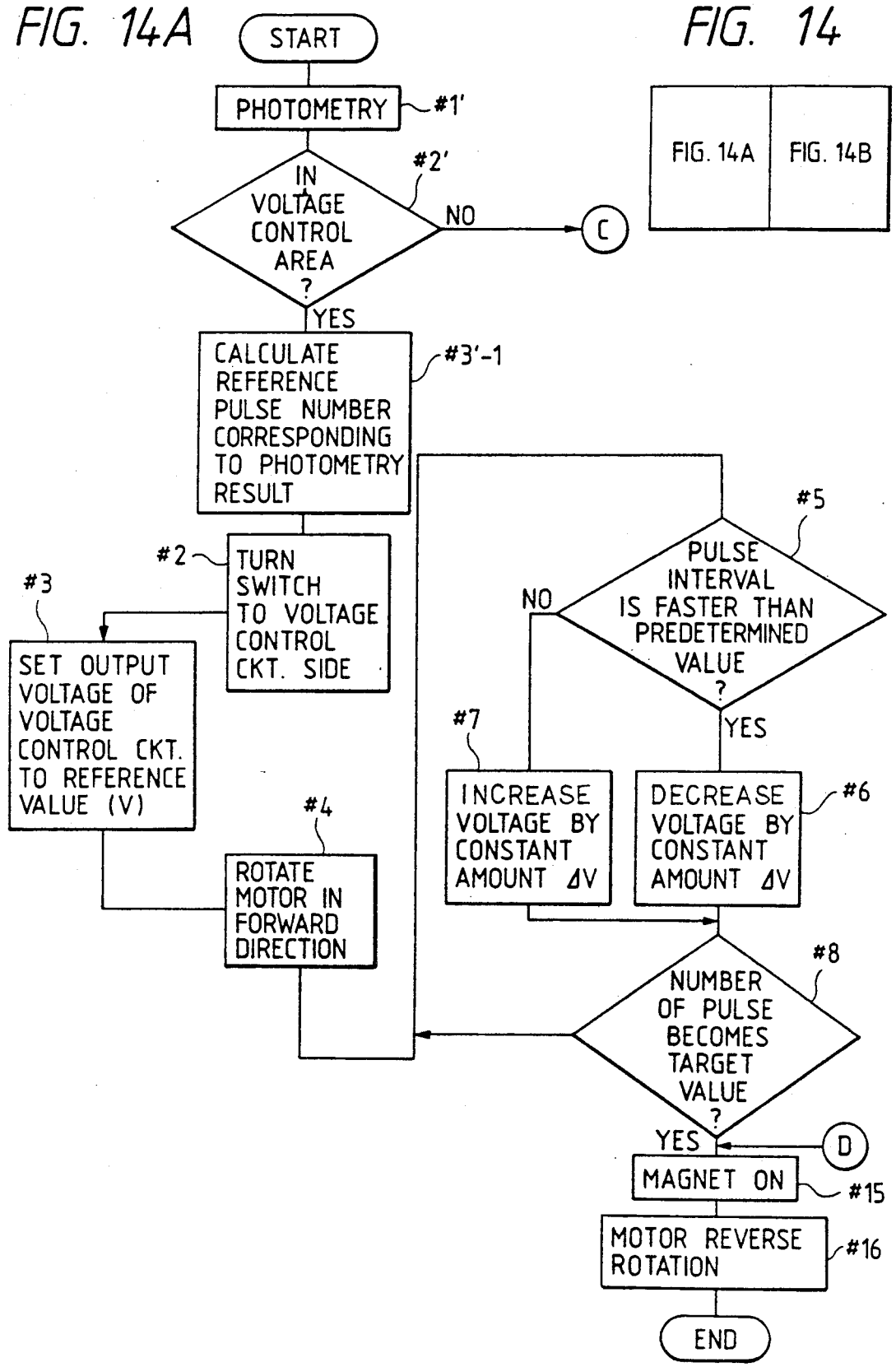

SHUTTER APPARATUS WHICH ALSO SERVES AS A DIAPHRAGM

BACKGROUND OF THE INVENTION

1. Field of the Invention

The present invention relates to a solenoid-driven, partly-open type shutter apparatus (diaphragm shutter apparatus) which is arranged to record a still image of an object on a recording medium by opening a shutter blade assembly.

2. Related Background Art

Such a partly-open type of shutter apparatus is generally arranged to gradually open a shutter blade assembly by the rotation of a motor, energize a control magnet to disengage a clutch when the aperture defined by the shutter blade assembly reaches a predetermined aperture value, and rapidly close the shutter blade assembly by utilizing the spring force of a spring associated therewith. The reason for adopting this arrangement is that a mechanism having a slow opening operation and a fast closing operation is advantageous for stabilizing the amount of exposure.

Another form of arrangement has been adopted in which gears and the like which constitute part of a shutter mechanism are restored to their initial positions by spring forces. There is also a known mechanism in which, after a shutter blade assembly has been closed, gears and the like are restored to their initial positions by reversing a motor.

A common type of control system for causing a motor to rotate to open the above-described shutter blade assembly is usually arranged to provide constant-voltage control (full energization) under which a power source voltage is supplied directly to the motor for the purpose of energization. To meet a demand for the development of a shutter having a higher accuracy, a control system of the type which provides constant-speed control over a shutter opening speed has recently been proposed.

The basic operation of such a partly-open type shutter apparatus is as follows. The partly-open type shutter apparatus serves as a diaphragm and a shutter, and is arranged in such manner that its aperture is gradually opened in association with the opening operation of the shutter blade assembly and, when the quality of light integrated on the surface of a photosensor reaches a predetermined value, a close signal is supplied to the shutter blade assembly and shutter control is in turn executed. However, in practice, if the shutter opening speed changes by the influence of a power source voltage or the like, there will occur an time interval between the application of the shutter close signal and the execution of the shutter control. As a result, the amount of exposure will vary owing to the fact that the aperture becomes excessively open for faster shutter opening speeds and imperfectly open for lower shutter opening speeds.

The variation in the amount of exposure leads to a so-called unevenness of exposure (generally known as the "unevenness of shutter operation"), which may result in a deterioration in the accuracy of shutter operation. The above-described conventional partly-open type of shutter apparatus has the following problems related to the deterioration in the accuracy of shutter operation due to the "unevenness of exposure".

For example, in a system in which a motor driving means is fully energized by applying a power source voltage for the purpose of opening a shutter blade assembly, the speed at which the shutter blade assembly opens changes due to variations in the power source voltage due to, for example, the dissipation of battery power, drifts in a circuit due to changes in environmental conditions, or load changes. It will therefore be difficult to achieve a highly accurate shutter speed.

In general, the running characteristics of the shutter blade assembly of the conventional partly-open type shutter apparatus are selected so that the amount of transmitted light limited by the shutter blade assembly is approximately proportional to the time required for individual shutter blades to run by their predetermined distances. If the variation of the shutter opening speed is made constant, the unevenness of exposure increases in approximately geometrical progression as the brightness of an object increases. For example, if the running time elapsed is represented as "1" with respect to the amount of transmitted light for an aperture of f/16, the running time elapsed is represented as "2" with respect to the amount of transmitted light for an aperture of f/11, "4" for f/8, "8" for f/5.6, and "16" for f/4. As can be seen from FIG. 16, the amount of light transmitted through each aperture diameter is approximately proportional to the time during which light is transmitted during a shutter running operation. In consequence, if the variation of the shutter opening speed is made constant, the unevenness of exposure may be serious in a high-brightness area in a case where it hardly appears in a low-brightness area. Accordingly, it is difficult to realize highly accurate control of a shutter by utilizing the above-described full energization system.

A so-called servo control system for providing constant-speed control over a shutter opening speed will be considered below. In this system, since the shutter opening speed is placed under constant-speed control, such opening speed does not change due to the variation of a power source voltage or variations in environmental conditions and therefore, no substantial variation in the amount of exposure is caused by an overrun occurring after the application of a shutter close signal. Accordingly, it is possible to maintain a high accuracy of shutter operation over the entire brightness area.

However, since it is impossible to provide constant-speed control in the state of full energization, the speed at which the shutter blade assembly is opening under the constant-speed control is naturally slower than the speed in the state of full energization. As a result, the shutter open time required to obtain a particular amount of exposure is long compared to that required for the full energization, as shown in FIG. 17. This means that, if a moving object is to be photographed in a low-brightness area, the constant-speed control system is unfavorable in that the shutter open time becomes long.

Electronic cameras utilizing solid-state image sensors such as CCDs (change-coupled devices) have also recently been developed. The solid-state image sensors for use in the electronic cameras have the problem of dark current inherent therein, and the length of exposure time is proportional to a deterioration in image quality due to the dark current. For this reason, if a partly-open type shutter apparatus utilizing the above-described constant-speed control system is applied to such an electronic camera, a lowering in the shutter opening speed may lead to a critical defect which aggravates a deterioration in image quality due to dark current, such as white scratches.

It is naturally advantageous in terms of shutter opening speeds to supply a power source voltage in the state of full energization. However, if account is taken into the problem of accuracy and the mechanical shock of a shutter-blade-assembly driving system occurring when the power source voltage is high, the above-described system in which the power source voltage is supplied in the state of full energization may not be desirable in terms of the durability of the apparatus.

To solve the above-described problems experienced with the constant-speed control of shutter opening speeds, needless to say, it is desirable that the shutter opening speeds be constantly set to high speeds. However, it is not easy to constantly set the shutter opening speeds to sufficiently high speeds since it is generally difficult to constantly maintain a high power source voltage in an actual camera.

This difficulty will be explained below with reference to FIG. 6 which shows the construction of a partly-open type shutter apparatus for providing conventional constant-speed control. In the apparatus shown in FIG. 6, a control circuit 3 for providing control over every element of the shutter apparatus receives a signal from a photometry circuit 1 for measuring the brightness of an object and a signal from a release signal generation circuit 2 for generating a release signal when detecting a shutter release switch SW (not shown). The control circuit 3 causes a motor driving circuit 7 to drive a motor 8 for opening a shutter blade assembly through a voltage control circuit 5.

After the shutter blade assembly has started its shutter opening operation by the driving force of the motor 8, a photointerrupter 12 detects the motion associated with the shutter blade assembly, and a position detection signal (h) indicative of the position of the shutter blade assembly is supplied to the control circuit 3 through a photointerrupter wave modulation circuit 11. The control circuit 3 analyzes the current shutter opening speed on the basis of the position detection signal (h) relative to the shutter blade assembly, and outputs the voltage control signal (a) and causes the motor driving circuit 7 to increase or decrease the speed of the motor 8 in accordance with whether the current speed is greater or smaller than the target value of the shutter opening speed.

When the shutter opening reaches a predetermined aperture diameter by the above-described operation, the control circuit 3 outputs a drive signal (g) to the magnet driving circuit 9, which in turn activates a magnet 10 to disengage a solenoid clutch (not shown), thereby rapidly restoring the shutter blade assembly to an initial position thereof by the spring force of a spring (not shown) so as to close the shutter blade assembly.

In the above-described circuit arrangement for driving and controlling the partly-open type shutter apparatus, an excessive voltage drop occurs across the voltage control circuit 5, with the result that it is difficult to realize constant-speed control during a high-speed shutter operation in the state of the power source voltage being low.

SUMMARY OF THE INVENTION

It is therefore an object of the present invention to provide a partly-open type shutter apparatus which can solve the above-described problems encountered with constant-speed control and which supplies, during an initial period of a shutter opening operation, a predetermined constant electrical power (the electrical power required for full energization) to activate and cause an electrical driving means such as a motor to perform the shutter opening operation and thereafter transfers to constant-speed control, whereby optimum shutter control is executed.

To achieve the above object, in accordance with one aspect of the present invention, there is provided an arrangement in which the time during which the shutter opening operation is executed with the aforesaid constant electrical power is controlled according to brightness whereby to drive a shutter to operate at a higher speed under a low-brightness condition than under a high-brightness condition.

It is another object of the present invention to provide a partly-open type shutter apparatus in which, during the aforesaid constant-speed control, the energization of a motor is, in a low-brightness condition, placed under duty control by the supply of electrical power corresponding to full energization so as to prevent the duration of a shutter open time from increasing, while voltage control is executed in a high-brightness condition, whereby the accuracy of a shutter operation is improved.

It is another object of the present invention to provide a partly-open type shutter apparatus in which, during the aforesaid constant-speed control, if a power source voltage is high, constant-speed control utilizing voltage control is performed, while if the power source voltage is low, constant-speed control utilizing duty control in the state of full energization is performed so that constant-speed control within a high speed range is executed independently of the state of the power source voltage.

The above and other objects, features and advantages of the present invention will be apparent from the following description of preferred embodiments of the invention with reference to the accompanying drawings.

BRIEF DESCRIPTION OF THE DRAWINGS

FIG. 2 and 3 are waveform diagrams illustrating the operation of the embodiment of FIG. 1;

FIGS. 4, 4a and 4b together form a control flowchart showing the embodiment of FIG. 1;

FIGS. 14, 14a and 14b together form a flowchart showing the control flow of the apparatus shown in FIG. 13;

DESCRIPTION OF THE PREFERRED EMBODIMENTS

Figure 1:
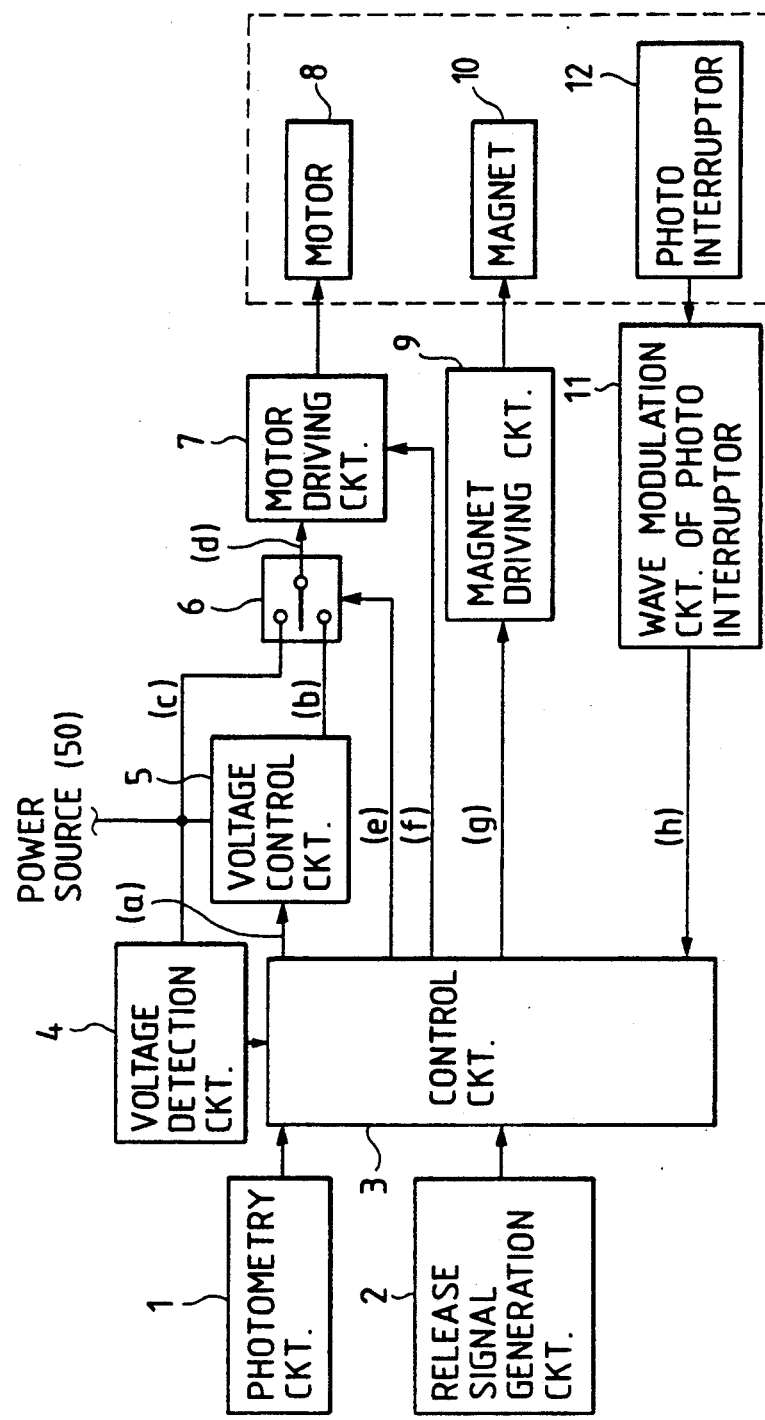
FIG. 1 is a block diagram showing one embodiment of a shutter apparatus which also serves as a diaphragm in accordance with the present invention.

Preferred embodiments of the present invention will be described below in detail with reference to the accompanying drawings, throughout which like reference numerals are used to denote the like or corresponding elements FIG. 1 is a block diagram showing a circuit arrangement according to a first embodiment of the present invention, and the illustrated circuit operates in accordance with the flow chart shown in FIG. 4. The mechanical structure of a partly-open type shutter apparatus according to the first embodiment is shown in FIG. 5 in schematic exploded form.

The circuit arrangement shown in FIG. 1 comprises a photometry circuit 1 for measuring the brightness of an object to be photographed, a release signal generation circuit 2 arranged to detect that a release switch (not shown) has been pressed and generate a release signal, and a control circuit 3 for controlling a shutter operation throughout its entire process, the control circuit 3 being constructed from, e.g. a microcomputer. The control circuit 3 provides control in accordance with the program shown in FIG. 4.

The illustrated circuit arrangement also comprises a power source voltage detection circuit 4, a voltage control circuit 5, a selection switch 6, a motor driving circuit 7, a motor 8, a magnet driving circuit 9, a magnet 10, and a photointerrupter wave modulation circuit 11.

The power source voltage detection circuit 4 is connected to an power source 50, and is arranged to supply a signal indicative of the state of voltage of the power source 50 to the control circuit 3.

The voltage control circuit 5 includes a constant-voltage control circuit for controlling the output voltage of the power source 50 to produce a constant voltage. The voltage control circuit 5 is also connected to the motor 8 through a first circuit for voltage supply, which extends from the power source 50 through the selection switch 6, which will be described later, to the motor driving circuit 7. The voltage control circuit 5 applies a constant voltage, which corresponds to a voltage control signal (a) supplied from the control circuit 3, to the motor driving circuit 8 so as to drive and open a shutter blade assembly (not shown in FIG. 1) at a constant speed.

The selection switch 6 is arranged to respond to a command given by the control circuit 3 to switch the path of connection between the electric power source 50 and the motor driving circuit 7 between the aforesaid first circuit and a second circuit in which the power source 50 is connected directly to the motor driving circuit 7.

The motor 8 rotates forwardly to open the shutter blade assembly, while, after it has been closed, the motor 8 is reversed to restore predetermined gears to the initial positions thereof. The motor 8 is driven by the motor driving circuit 7.

The magnet driving circuit 9 is actuated at a predetermined timing by the control circuit 3 and, when the aperture defined by the shutter blade assembly reaches a predetermined diameter, the circuit 7 drives a magnet 10 provided for disengaging a clutch which serves to rapidly close the shutter blade assembly.

The photointerrupter wave modulation circuit 11 shapes the waveform of a signal supplied from the photointerrupter 12, such a signal being produced in correspondence with the motion of the pulse plate shown in FIG. 5 which is arranged in association with the shutter blade assembly. The photointerrupter wave modulation circuit 11 supplies the obtained position signal (h) indicative of the position of the shutter blade assembly to the control circuit 3 for the purpose of controlling a shutter operation.

The mechanical structure of a party-open type shutter apparatus according to the first embodiment will now be described with reference to FIG. 5.

The motor 8, which causes a shutter spring to perform a shutter opening operation, is fixed to a base plate 31 integral with a camera body (not shown), and a rotary shaft 8a is inserted through an opening 31h formed in the base plate 31 to extend into a side opposite to the side on which the motor 8 is fixed. A pinion 32, which is press-fitted onto the rotary shaft 8a, is meshed with a gear train formed by a first reduction gear 13 and a second reduction gear 14 which are rotatably fitted onto gear shafts 31a and 31b of the base plate 31, respectively. A rack 15 is supported with its slots 15c and 15d receiving respectively shafts 31g and 31f projecting from the base plate 31, in such a manner that the rack 15 can be slid in the direction in which its teeth are formed in alignment, i.e. in the approximately lateral direction as viewed in FIG. 1.

A rack spring 16 is supported by a spring supporting shaft 31c of the base plate 31. One end of the rack spring 16 is engaged with a projection 31d of the base plate 31, while the other end is engaged with a projection 15a of the rack 15, whereby the rack spring 16 acts to steadily press the rack 15 against a stopper 31e of the base plate 31.

A clutch 18 has a rotary shaft 19 which is secured to the rack 15 in such a manner as to extend through an opening 15b in the rack 15. A clutch spring 17 is secured to the extending end of the shaft 19 so that an end 18a of the clutch 18 is urged in the clockwise direction as viewed in FIG. 1 to be pressed against a projection 20b of a shutter plate 20. As the rack 15 moves rightwardly as viewed in FIG. 1, the shutter plate 20 is rotated counterclockwise as viewed in FIG. 1.

The shutter plate 20 is arranged so that, as the projection 20b is pressed by the end 18a of the clutch 18, the shutter plate 20 can rotate counterclockwise as viewed in FIG. 1 about a bore 20a formed axially in a fixed shaft (not shown).

The shutter plate 20 has a toothed, arcuate outer periphery 20c so that a gear portion 21a of the pulse plate 21, which is engaged with the outer periphery 20c, can be rotated by the aforesaid counterclockwise rotation of the shutter plate 20. Reference numeral 22 denotes a return spring for the pulse plate 21, and the above-described photointerrupter 12 is disposed to read out an alternate pattern of light and darkness, formed on the pulse plate 21 as shown, during the rotation of the pulse plate 21.

Shutter blades 24 and 25 have openings 24a and 25a, respectively. The openings 24a and 25a are combined to define the size of a shutter aperture in accordance with the magnitude of relative displacement of the shutter blades 24 and 25 which overlap each other. Slots 24b and 25b, which are formed in the respective shutter blades 24 and 25, engage respectively with a pair of projections 20d and 20e of the shutter plate 21 so that the shutter aperture formed by the overlapping openings 24a and 25a can be opened as a result of the rotation of the shutter plate 20.

An attraction magnet is formed by elements 26 to 30 as follows. When the coil 29 is energized, the armature 26 is attracted upwardly and a working portion 26a formed at one end of the armature 26 strikes a projection 18b of the clutch 18 upwardly to move the end 18a of the clutch 18 upwardly. The end 18a of the clutch 18 is in turn disengaged from the projection 20b of the shutter plate 20, whereby the shutter plate 20 is rapidly restored to its initial position by the spring force of the return spring 22 to close the shutter blade assembly. Reference numeral 27 denotes an armature shaft, reference numeral 28 denotes a yoke, and reference numeral 30 denotes a coil shaft inserted through a coil 29 and secured to the yoke 28.

The operation of the shutter apparatus having the above-described arrangement will be described in brief with reference to FIG. 5.

When the release switch of a camera (not shown) is depressed, the motor 8 rotates to open the shutter blade assembly (the motor 8 rotates counterclockwise as viewed in FIG. 5, forwardly as described in connection with FIG. 1). The first reduction gear 13 rotates clockwise as viewed in FIG. 5 with the rotation of the pinion 32 and the second reduction gear 14 in turn rotates counterclockwise as viewed in FIG. 5. The rack 15 is slid approximately rightwardly along a line which connects the shafts 31g and 31f of the base plate 31.

As the rack 15 slides, the end 18a of the clutch 18, which is urged downwardly as viewed in FIG. 5 by the clutch spring 17, presses the projection 20b of the shutter plate 20 to cause the shutter plate 20 to rotate counterclockwise as viewed in FIG. 5.

As the shutter plate 20 rotates, the pulse plate 21 is rotated counterclockwise as viewed in FIG. 5 against the spring 22 owing to the engagement between the pulse 21 and the toothed outer periphery 20c. In this manner, the photointerrupter 12 outputs a pulse corresponding to the angle of rotation of the shutter plate 20 when each of the light and dark portions is passed.

The projections 20d and 20e formed on the bottom surface of the shutter plate 20 actuate the corresponding shutter blades 24 and 25 in cooperation with the respective engaged slots 24b and 25b so that the aperture defined by the overlapping openings 24a and 25a is widened to effect exposure.

As the above-described motion continues, the number of pulses detected from the photointerrupter 12 gradually increases. If the aperture defined the overlapping openings 24a and 25a of the respective shutter blades 24 and 25 reaches an aperture size corresponding to the brightness of an object, the control circuit 3 shown in FIG. 1 energizes the coil 29 of the magnet 10, thereby disengaging the clutch 18. In this manner, the above-described operation of restoring the shutter plate 20 to the initial position is effected.

After the above-described exposure operation has been completed, the pinion 32, the first reduction gear 13 and the second reduction gear 14 are moved toward their initial positions by the reverse motion of the motor 8, and the end 18a of the clutch 18 secured to the rack 15 finally comes into engagement with the projection 20b of the shutter plate 20 and returns to its initial state. A series of operations during a shutter opening period is in turn completed.

The above-described series of operations performed by the mechanism shown in FIG. 5 are substantially the same as those of a conventional semi-open shutter apparatus. In the first embodiment, however, the shutter-blade opening operation is appropriately controlled depending on the voltage state of the power source, whereby no mechanical contact occurs between driven elements and no abnormal friction or collision takes place in each engaged portion. Accordingly, it is possible to achieve a stable and smooth release operation.

More specifically, in the first embodiment, the power source voltage detection circuit 4 detects the voltage stage of the power source 50. If the detected power source voltage is high, the voltage control circuit 5 is made to increase or decrease a supply voltage thereby providing constant-speed control over the motor 8, while, if the detected power source voltage is low, the motor driving circuit 7 is switched on and off to provide constant-speed control.

Figure 4B:
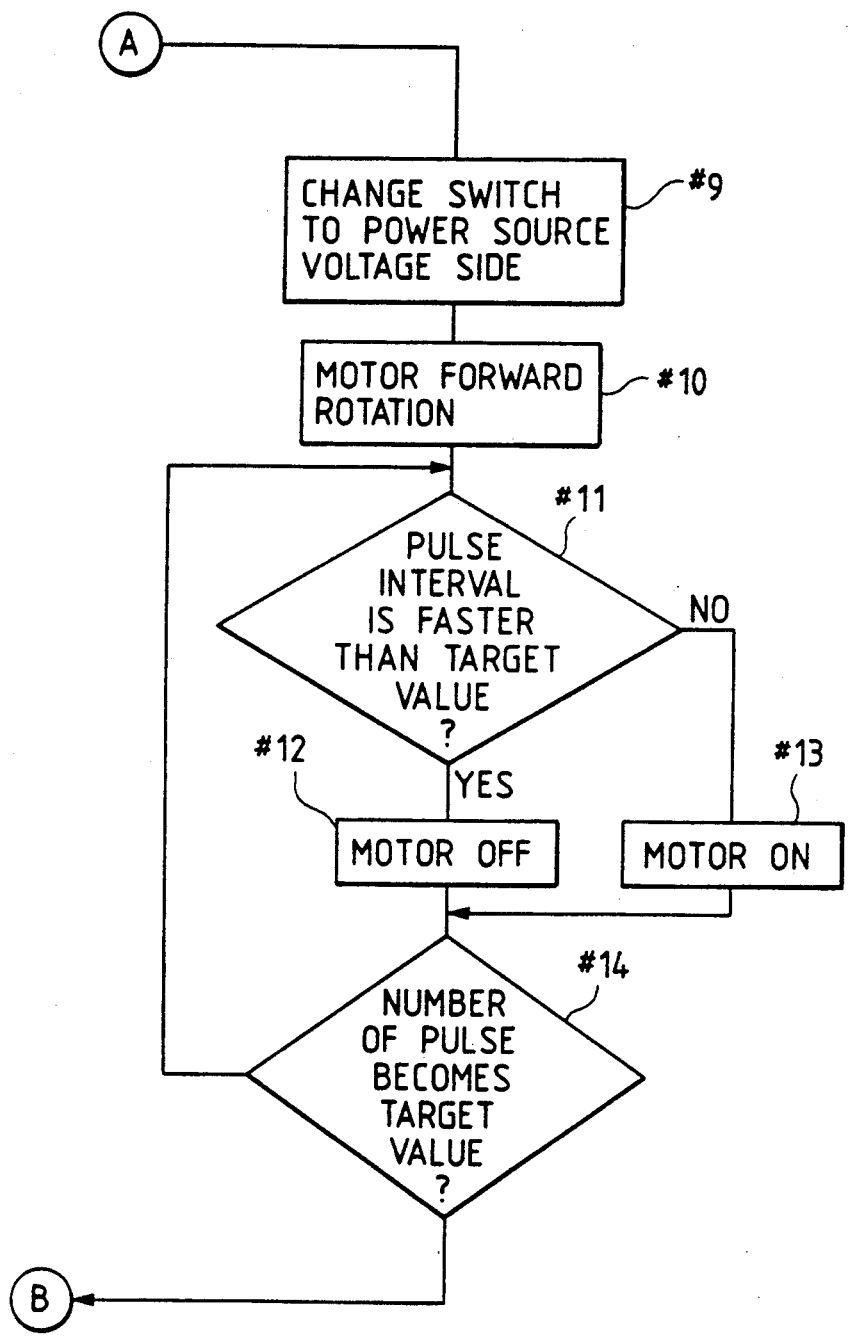
Figure 5:
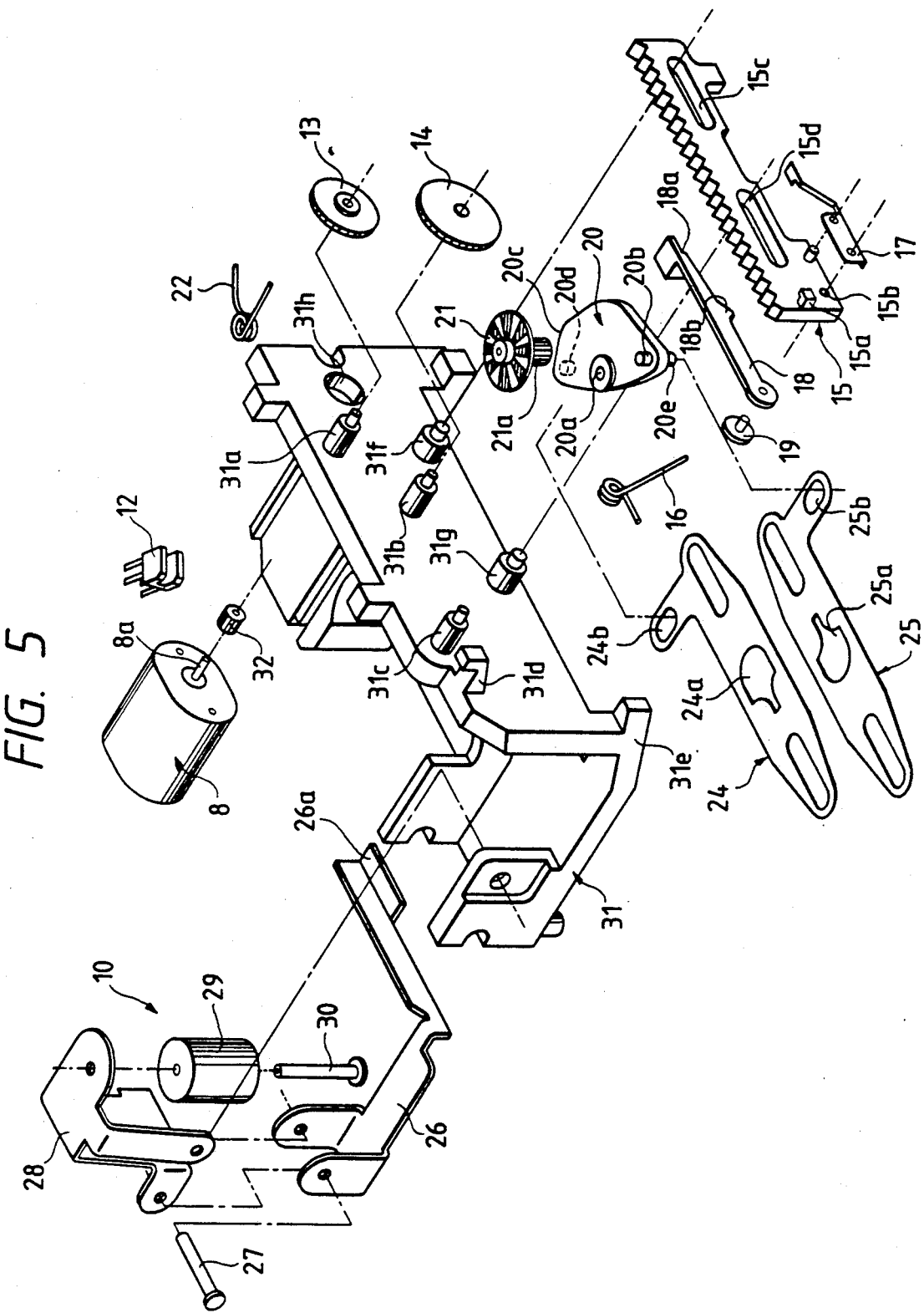
FIG. 5 is a schematic, exploded view showing the mechanism of the shutter apparatus shown in FIG. 1.
Figure 6:
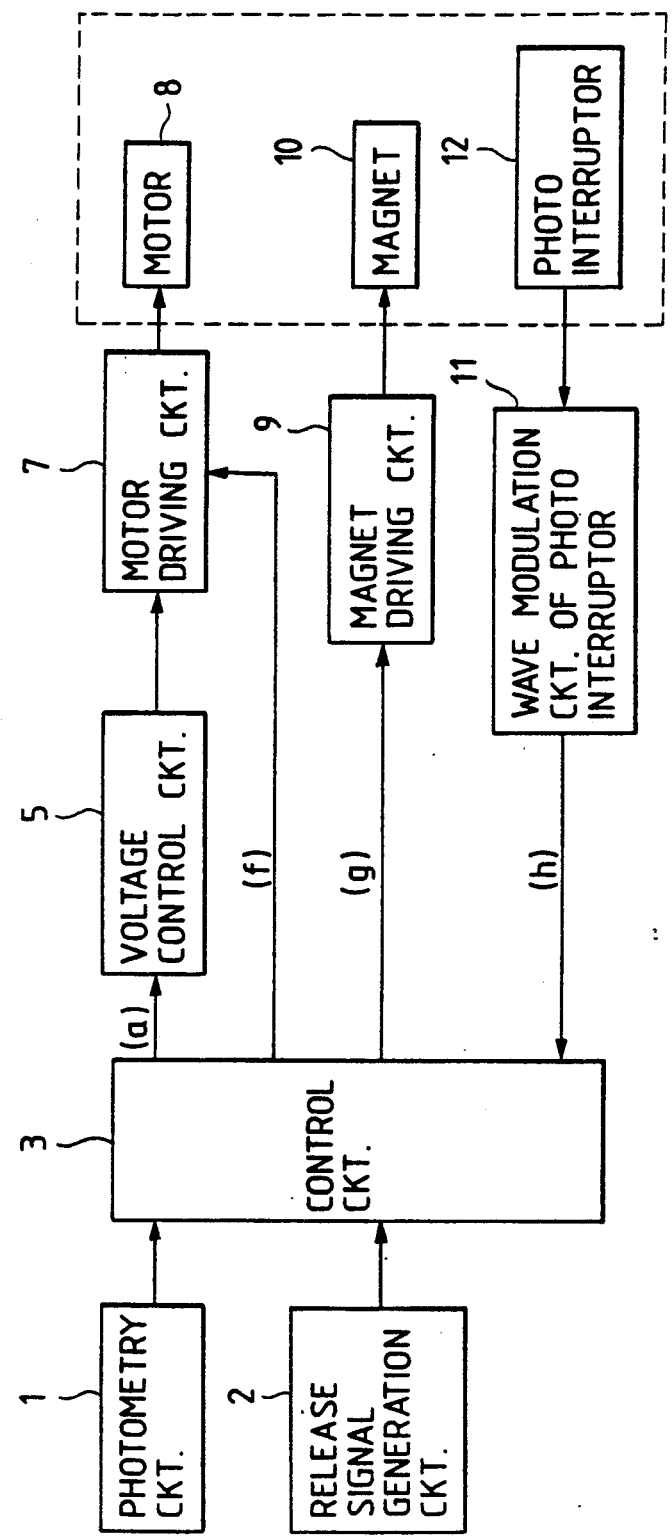
FIG. 6 is a block diagram showing an example of a conventional shutter apparatus.

Each step of the above-described control operation is diagrammatically illustrated in the flowchart of FIG. 4.

The control operation will now be described with reference to FIG. 4. First of all, when the release switch is depressed, the release signal generating circuit 2 transmits a corresponding release signal to the control circuit 3.

In accordance with the input release signal, the control circuit 3 detects the output signal of the photometry circuit 1, effects A/D conversion of the photometric output, and obtains the number of pulses corresponding to the photometric output (Step #1). Thus, in Step #1, the control circuit 3 detects the output or power source voltage of the power source voltage detecting circuit 4, whereby it is determined whether the detected voltage is in an area where a shutter opening operation needs to be placed under constant-speed control based on the voltage supplied from the voltage control circuit 5. This decision is made by a comparison between a predetermined threshold voltage (reference voltage) and the detected voltage.

If it is determined by such a comparison that the detected voltage is in the area where the shutter opening operation needs to be placed under constant-speed control based on the voltage supplied from the voltage control circuit 5, that is to say, if it is determined that the power source voltage is higher than a reference voltage, the control circuit 3 outputs a switching signal (e) (Step #2) to connect the selection switch 6 to a voltage control circuit side (the lower-contact side shown in FIG. 1) which corresponds to the first circuit. In contrast, if it is determined that the detected voltage is in the area where the shutter opening operation should not be placed under constant-speed control based on the voltage supplied from the voltage control circuit 5, the process proceeds to Step #9, where the control circuit 3 connects the selection switch 6 to a power source side (the upper-contact side shown in FIG. 1) which corresponds to the second circuit.

After the above-described setting has been completed, the control circuit 3 transmits a motor-forwardrotation signal (f) to the motor driving circuit 7 to cause it to initiate a shutter opening operation.

The actual driving condition of the motor 8 will now be described with reference to specific cases.

CASE WHERE FIRST CIRCUIT IS SELECTED AND VOLTAGE CONTROL CIRCUIT 5 PROVIDES CONSTANT-SPEED CONTROL

After Step #2 has been executed, the process proceeds to Step #3, where the control circuit 3 supplies the voltage control signal (a) to the voltage control circuit 5. The voltage control circuit 5 outputs a voltage of reference value corresponding to the voltage control signal (a) to supply such a voltage to the motor driving circuit 7 through the selection switch 6 as a motor drive voltage (d). In Step #4, when the control circuit 3 supplies a motor forward rotation period signal to the motor driving circuit 7 as a motor control signal (f), the motor driving circuit 7 drives the motor 8 forwardly, thereby starting to open the shutter blade assembly When the shutter opening operation is started in the above-described manner, the photointerrupter 12 detects a signal associated with opening members provided for opening the shutter blade assembly and then supplies the signal to the control circuit 3 from the photointerrupter wave modulation circuit 11 as the position detection signal (h). In Step #5, the control circuit 3 analyzes a shutter opening speed of interest on the basis of the input signal (h). If the analyzed opening speed is faster than a predetermined target value, the process proceeds to Step #6, where the voltage is decreased to slow down the shutter opening speed. If the analyzed opening speed is slower than the predetermined target value, the process proceeds to Step #7, where control is provided over the voltage control circuit 5 to make fast the shutter driving speed, thereby maintaining the shutter opening speed constant. In other words, in Step #5, the interval T at which pulse signals are inputted as the position detecting signal (h) is obtained in Step #5 and the interval T is compared with a target interval To. If To > T, the process proceeds to Step #6, where the voltage is decreased by ΔV with respect to the reference value V. If To < T, the process proceeds to Step #7, where the voltage is increased by ΔV with respect to the reference value V. In this manner, the shutter opening speed is controlled to be constant.

One example of the control of increasing and decreasing the motor drive voltage (d) based on the position detection signal (h) is shown in FIG. 2.

Referring back to FIG. 4, in Step #8, the number of pulses or position detection signals detected from the photointerrupter 12 is counted and, if the count reaches the number of pulses obtained in Step #1', the process proceeds to Step #15, where the coil 29 of the magnet 10 is energized to disengage the clutch 18, thereby closing the shutter blade assembly.

Thereafter, in Step #16, the motor 8 is reversed to initialize the mechanism.

CASE WHERE SECOND CIRCUIT IS SELECTED AND VOLTAGE IS SUPPLIED FROM POWER SOURCE DIRECTLY TO MOTOR DRIVING CIRCUIT

In this case, the selection switch 6 is switched to the upper-contact side as viewed in FIG. 1 so that the power source voltage is supplied directly to the motor driving circuit 7 as the motor driving voltage (b). In Step #10, the motor forward rotation period signal is supplied from the motor driving circuit 7 to the motor driving circuit 7 as the motor control signal (f). At this time, the motor driving circuit 7 drives the motor 8 to start opening the shutter blade assembly. This operation is the same as that executed by applying a voltage to the motor driving circuit 7 through the first circuit.

If the second circuit of the first embodiment is utilized, constant-speed control of the shutter opening operation is performed substantially in the following manner.

More specifically, when a shutter opening operation is started, the photointerrupter 12 detects a signal associated with the opening members provided for opening the shutter blade assembly and the supplies the signal to the control circuit 3 from the photointerrupter wave modulation circuit 11 as the position detection signal (h).

In Step #11, the control circuit 3 analyzes a relevant shutter opening speed on the basis of the input signal (h). If the analyzed opening speed is faster than a predetermined target value, the process proceeds to Step #12, where the supply of the motor forward rotation signal is stopped, the motor 8 is rotated inertially. Accordingly, the shutter opening speed is slowed down due to a load resulting from the shutter opening operation. If the shutter opening speed falls below the target value, the control circuit 3 again outputs a motor forward rotation period signal to increase the shutter opening speed in Step #13. The above-described control operation is repeated to maintain the shutter opening speed substantially constant. The operation of Step #11 is the same as that of Step #5.

The ON and OFF states of the signal outputs thus obtained are illustratively shown in FIG. 3.

In Steps #14, #15 and #16, if the number of pulses reaches a predetermined value, the control circuit 3 switches on the magnet 10 to open the shutter blade assembly, and outputs a motor reversal signal as the motor-forward-rotation signal (f) to reverse the motor 8, thereby restoring predetermined gears to the initial positions thereof, as described previously.

As is apparent from the foregoing, in accordance with the first embodiment, since the above-described different controls are provided in accordance with the various voltage states of the power source voltage, it is possible to open the shutter blade assembly under substantially constant speed control whether the power source voltage is high or low.

Figure 7:
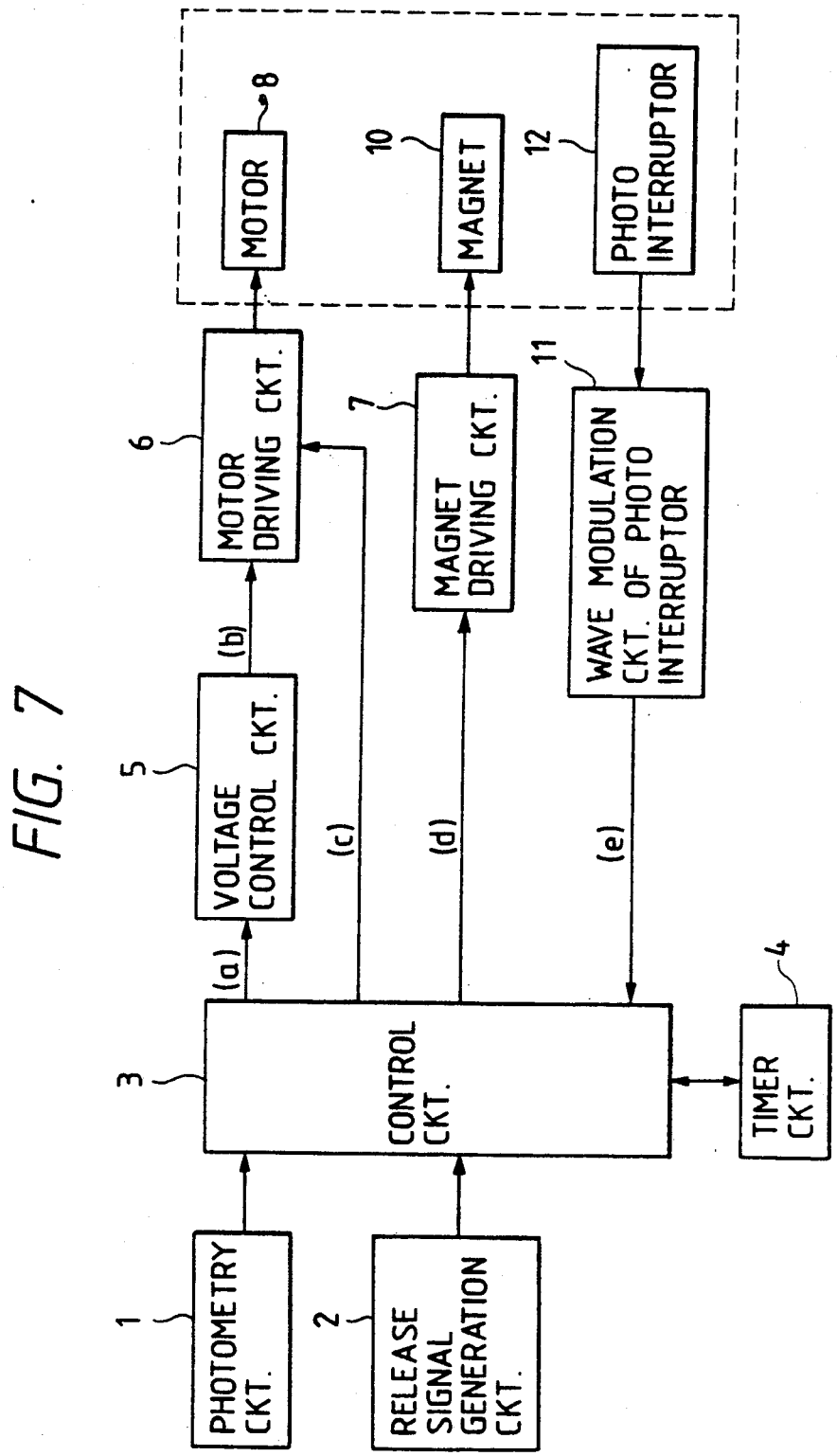
FIG. 7 is a block diagram showing another embodiment of the present invention.
Figure 8:
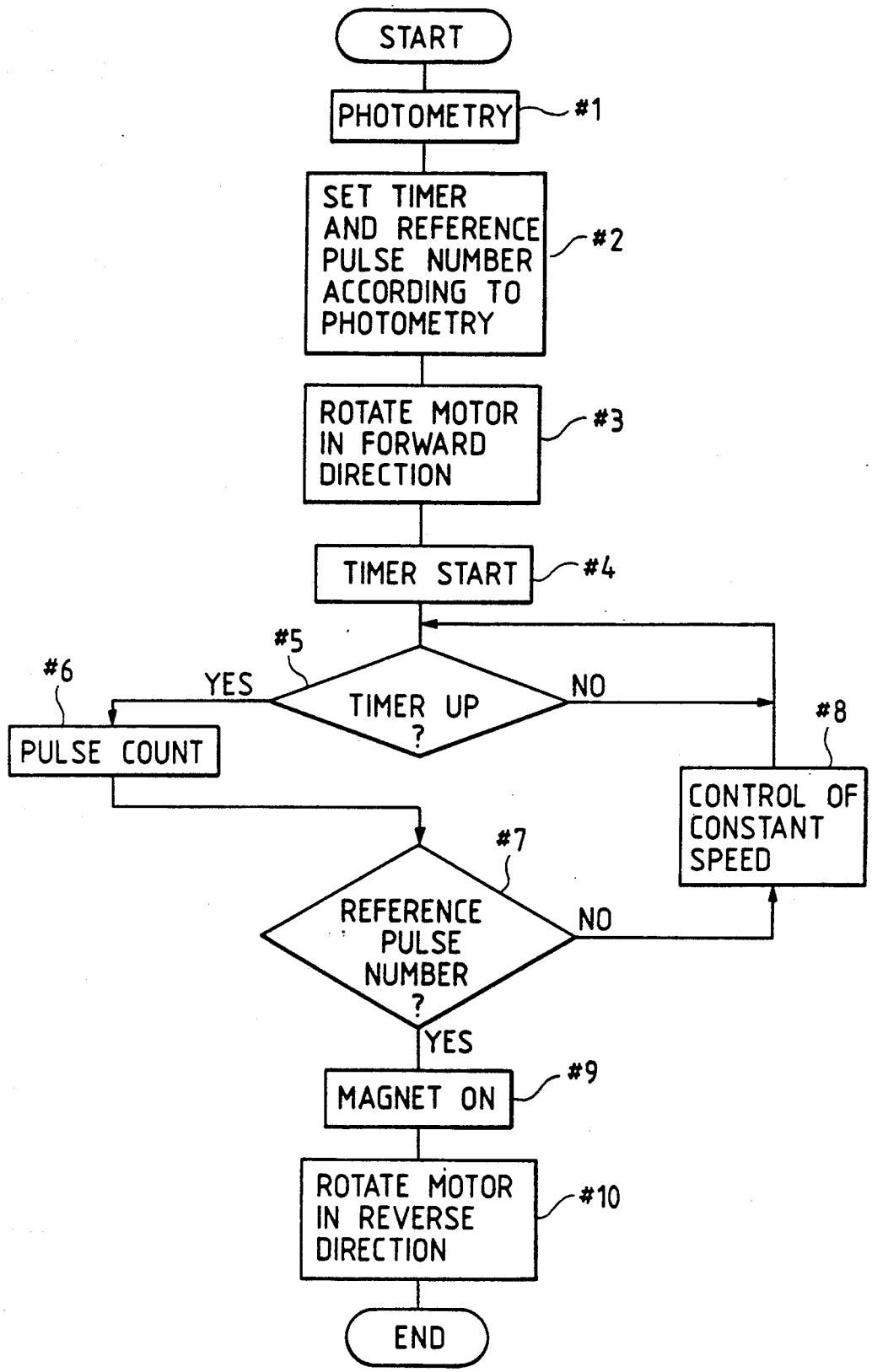
FIG. 8 is a flowchart showing the control flow of the embodiment of FIG. 7.
Figure 9:
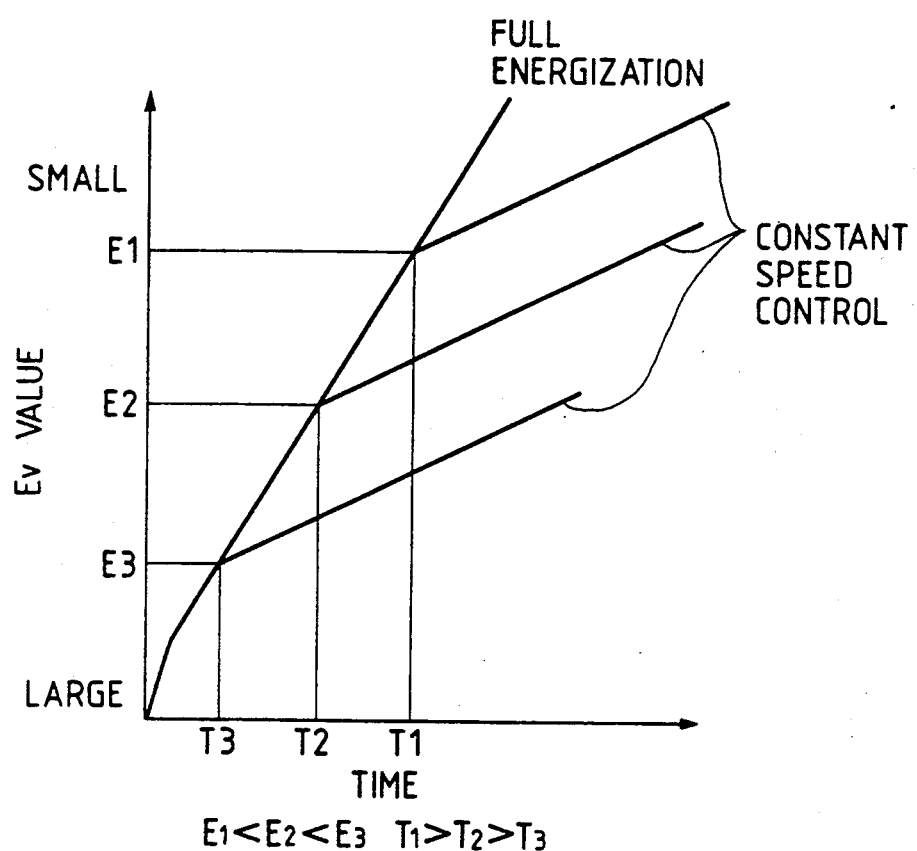
FIG. 9 is a characteristic diagram illustrating the operation of the embodiment of FIG. 7.

FIG. 7 is a block diagram showing a circuit arrangement according to a second embodiment of the present invention, and the illustrated circuit operates in accordance with the flow chart shown in FIG. 8. The mechanical structure of a partly-open type shutter apparatus according to the second embodiment is shown in FIG. 5 in schematic exploded form. FIG. 9 is a graphic representation showing the relationship between the time required to energize the motor driving circuit 7 to open the shutter blade assembly and the speed at which the shutter blade assembly is opened.

The circuit arrangement shown in FIG. 7 comprises the photometry circuit 1 for measuring the brightness of an object to be photographed, the release signal generation circuit 2 arranged to detect that the release switch (not shown) has been pressed and generate a release signal, and the control circuit 3 for controlling a shutter operation throughout its entire process, the control circuit 3 being constructed from, e.g. a microcomputer.

The control circuit 3 provides control in accordance with the program shown in FIG. 4.

The illustrated circuit arrangement also comprises a timer circuit 4, the voltage control circuit 5, a motor driving circuit 6, a magnet driving circuit 7, the motor 8, the magnet 10, the photointerrupter wave modulation circuit 11, and the photointerrupter 12.

The timer circuit 4 measures the time elapsed until the motor 8 is fully energized, and transmits the measurement result to the control circuit 3.

The voltage control circuit 5 is disposed midway along a circuit which leads from an power source (not shown) to the motor driving circuit 6, in such a manner as to the shutter blade assembly is driven and opened. The voltage control circuit 5 applies a constant voltage, which corresponds to the voltage control signal (a) supplied from the control circuit 3, to the motor driving circuit 6.

The motor 8 rotates forwardly to open the shutter blade assembly, while, after it has been closed, the motor 8 is reversed to restore predetermined gears to the initial positions thereof. The motor 8 is driven by the motor driving circuit 6.

The magnet driving circuit 7 is actuated at a predetermined timing by the control circuit 3 and, when the aperture defined by the shutter blade assembly reaches a predetermined diameter, the circuit 7 drives the magnet 10 provided for disengaging a clutch which serves to rapidly close the shutter blade assembly.

The photointerrupter wave modulation circuit 11 shapes the waveform of a signal supplied from the photointerrupter 12, such a signal being produced in correspondence with the motion of the pulse plate shown in FIG. 5 which is arranged in association with the shutter blade assembly. The photointerrupter wave modulation circuit 11 supplies the obtained position signal (e) indicative of the position of the shutter blade assembly to the control circuit 3 for the purpose of controlling a shutter operation.

First of all, when the release switch of the camera is depressed, the release signal generation circuit 2 transmits a corresponding release signal to the control circuit 3.

The control circuit 3 drives the photometry circuit 1 to detect the brightness of an object as brightness information (Step #1). When the control circuit 3 receives the brightness information and information on the sensitivity of the film used, the control circuit 3 calculates the time to be set on the timer circuit 4, that is, the time required to fully energize the motor driving circuit 6, and set the timer circuit 4 to the calculated time (Step #2). The number of pulses corresponding to an aperture value which provides an appropriate exposure corresponding to the output of the photometry circuit 1 is also obtained.

Thereafter, in Step #3, the control circuit 3 supplies a motor forward rotation period signal to the motor driving circuit 6 as a motor control signal (c), thereby starting to open the shutter blade assembly. In Step #4, at the same time that the motor forward rotation period signal is outputted, the control circuit 3 outputs a timer start signal to the timer circuit 4, thereby activating it.

When the shutter opening operation is started, the photointerrupter 12 detects a signal associated with the motion of the shutter plate 21 serving as an opening member and then supplies the signal to the control circuit 3 from the photointerrupter wave modulation circuit 11 as the position detection signal (e).

In Step #5, when the control circuit 3, which has received the position detection signal (e), receives a signal indicative of the completion of the time required to fully energize the motor 8 (a timer-up signal), the process proceeds to Step #6, where shutter-opening control is passed to constant-speed control.

In the constant-speed control, if the shutter opening speed analyzed from the position detection signal (e) is faster than a predetermined target value, the voltage is decreased to slow down the opening speed. If the analyzed opening speed is slower than the predetermined target value, the voltage is increased to speed up the opening speed.

More specifically, in Step #6, the number of pulses supplied as the position detection signal (e) is counted and, in Step #7, it is determined whether the number of pulses counted is equal to the number of pulses obtained in Step #2. The process proceeds to Step #8, where voltage control is provided over the motor 8 at the aforesaid pulse interval T and in a manner similar to that explained in connection with Steps #5, #6 and #7 of FIG. 4.

The above-described operations are repeated until the aperture defined by the shutter blade assembly reaches a predetermined diameter, that is, until it is determined in Step #7 that the count reaches the number of reference pulses. When the predetermined aperture diameter is reached, that is, when the count obtained in Step #6 reaches a predetermined number of pulses, the process proceeds to Step #9, where the control circuit 3 causes the magnet driving circuit 7 to drive the magnet 10 to actuate the clutch 18 explained in connection with FIG. 5, thereby rapidly restoring the shutter plate 20 to the initial position thereof.

Thereafter, the process proceeds to Step #10, where the control circuit 3 outputs a motor reverse signal as the motor control signal (c) to restore gears or the like to their initial positions, thereby completing a series of shutter opening and closing operations.

FIG. 9 is a graphic representation showing the relationship between the above-described operation of opening the shutter blade assembly (full-energization times $T_1$, $T_2$ and $T_3$) and Ev values $E_1$, $E_2$ and $E_3$ based on the brightness of an object detected by the photometry circuit 1. As can be seen from FIG. 9, the motor 8 is placed under full-energization control until any of the Ev values $E_1$, $E_2$ and $E_3$, at each of which the shutter blade assembly is opened to an intermediate aperture diameter by full energization, is reached. When any of the Ev values $E_1$, $E_2$ and $E_3$ is reached, the voltage control circuit 5 executes constant-speed control.

The relationship between these Ev values and the full energization is obtained in Step #2. More specifically, a ROM incorporated in the microcomputer stores a table which indicates the time relationships between the Ev values and full energization shown in FIG. 9. In Step #2, the required full energization time (timer interval) is obtained from the table on the basis of a photometric output from the photometry circuit 1. In FIG. 9, the relationships between $T_1$, $T_2$ and $T_3$ and $E_1$, $E_2$ and $E_3$ are represented by $T_1 < T_2 < T_3$ and $E_1 < E_2 < E_3$, respectively.

In the above-described second embodiment, the time required to reach the state of full energization during an initial period of a shutter opening operation is calculated on the basis of the brightness information about an object, which is detected by the photometry circuit 1. The timer circuit 4 then measures the time elapsed until the state of full energization is reached, whereby control is switched. In such a control, it is also possible to keep constant a voltage to be applied for full energization by means of the voltage control circuit 5. Otherwise, the time required to apply a voltage until the state of full energization is reached may also be set to a predetermined time period, and the level of applied voltage in the state of full energization may be controlled to be maintained at a constant value on the basis of the aforesaid brightness information.

Figure 10:
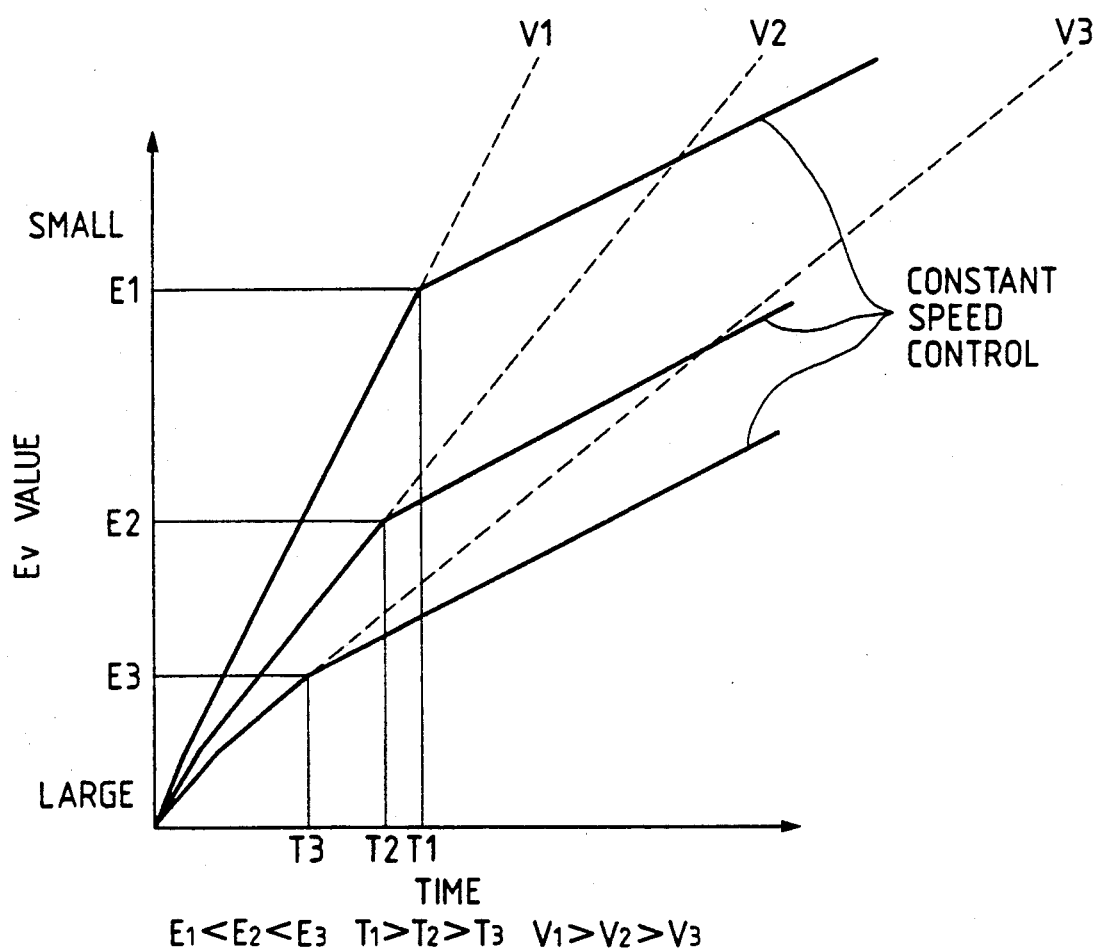
FIG. 10 is a characteristic diagram illustrating the characteristics of a shutter control operation based on the flowchart of FIG. 11.
Figure 11:
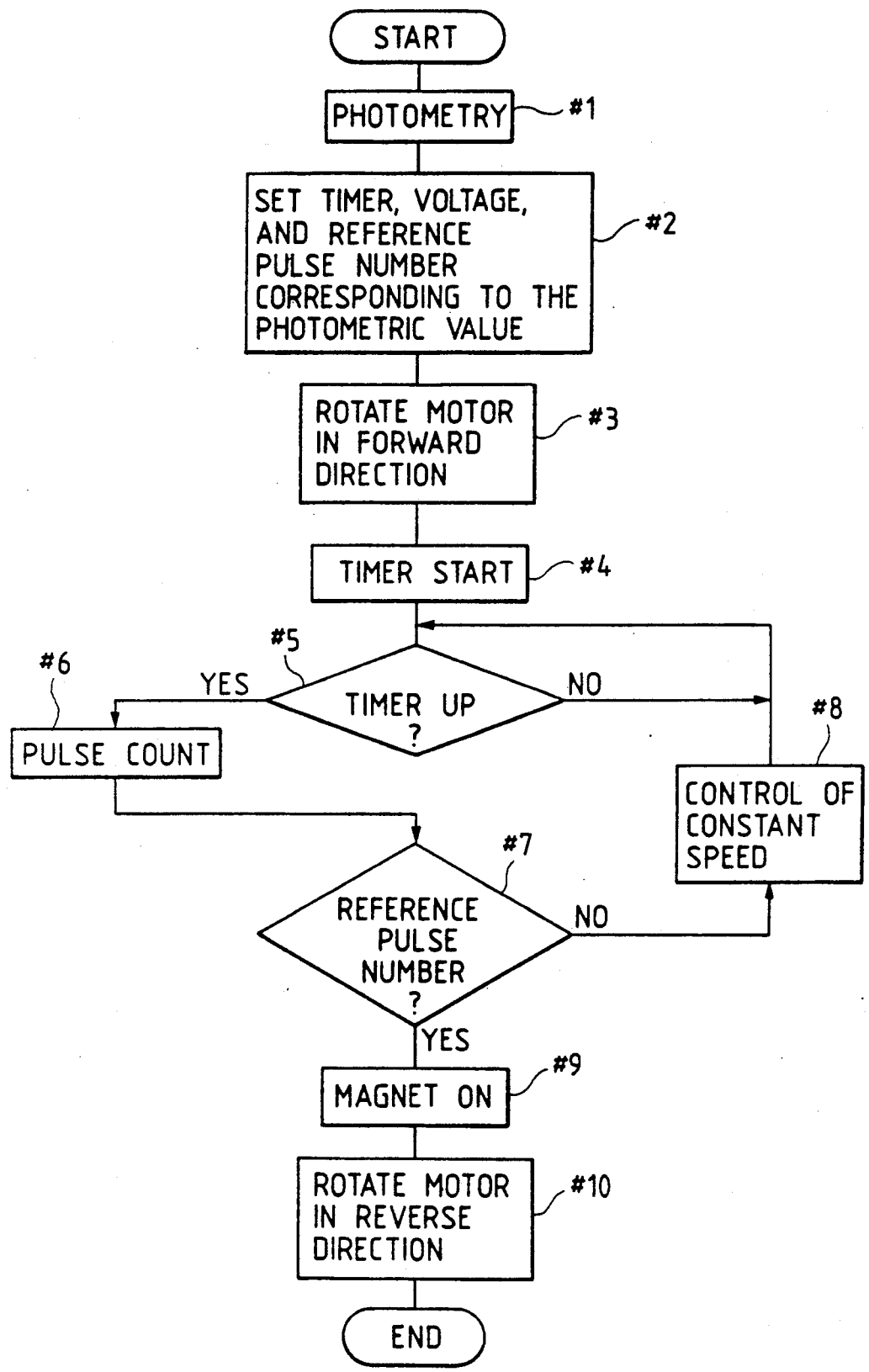
FIG. 11 is a flowchart showing the control flow of another embodiment of the present invention.

FIG. 10 is a graphic representation which serves to illustrate control characteristics obtained by providing variable control over voltages ($V_1 > V_2 > V_3$), each of which corresponds to full energization, with respect to the respective Ev values ($E_1 < E_2 < E_3$) which are obtained from brightness information for photography. FIG. 11 is a flowchart showing the control of setting the time and voltage value required to achieve full energization during the initial period of a shutter opening operation on the basis of the brightness information detected by the photometry circuit 1.

Figure 12:
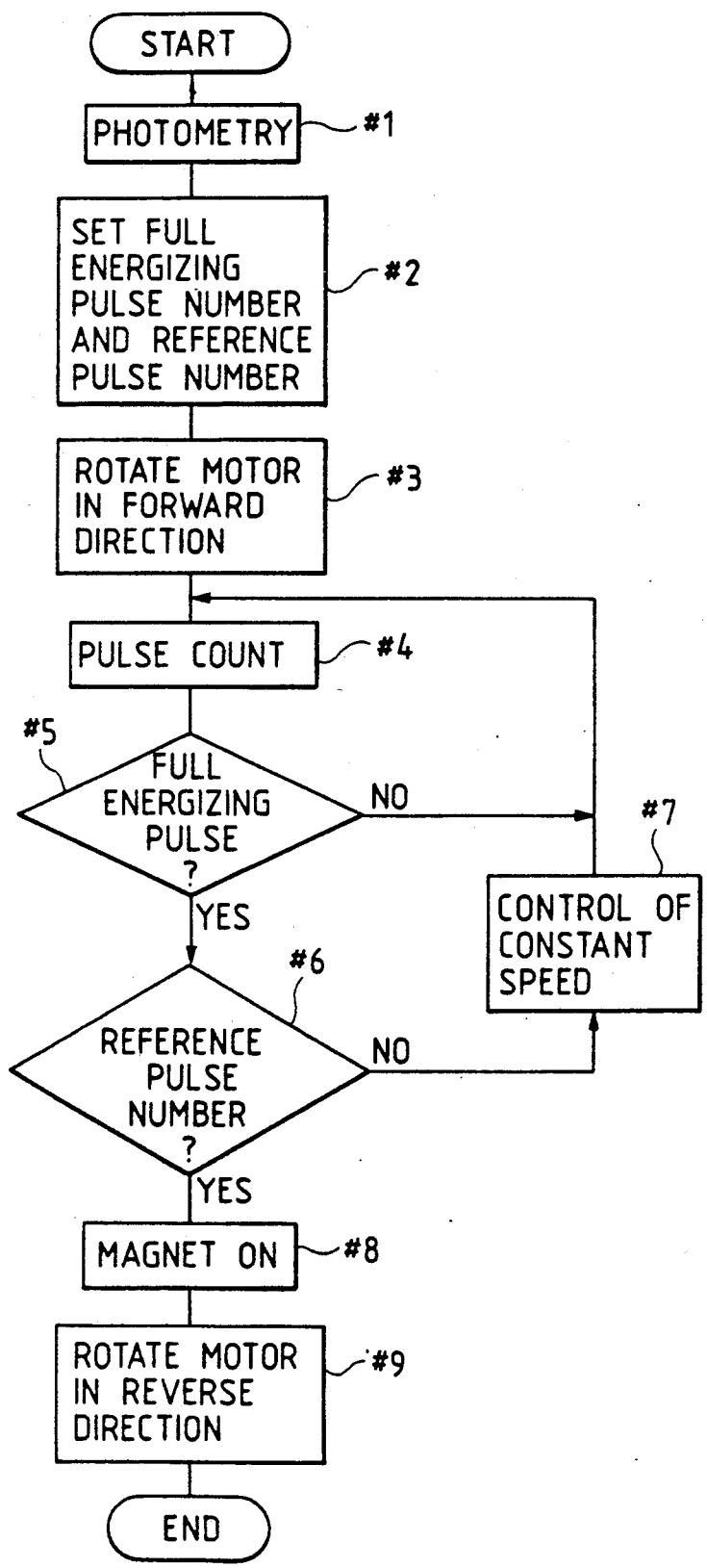
FIG. 12 is a flowchart showing the control flow of another embodiment of the present invention.

FIG. 12 is a flowchart showing a third embodiment of the present invention. Control utilizing the flowchart is characterized in that the end of a full energization operation in the initial period of a shutter opening operation and the end of the succeeding constant control are set as individual aperture values of the shutter blade assembly on the basis of the brightness information detected by the photometry circuit 1 and the shutter opening operation is controlled on the basis of these aperture values. The flow shown in FIG. 12 is carried out with the circuit arrangement of FIG. 7.

The arrangement and operation of the third embodiment will now be explained with reference to FIGS. 7 and 12.

Referring to FIG. 7 as well FIG. 12, when the release switch of the camera is depressed, the release signal generation circuit 2 transmits a release signal to the control circuit 3, which in turn drives the photometry circuit 1 to detect the brightness of an object to be photographed (Step #1). In Step #2, the number of pulses corresponding to a first aperture value which indicates the end of a full energization operation in the initial period of a shutter opening operation and the number of pulses corresponding to a second aperture value which indicates the end of the operation of providing constant-speed control over the shutter opening operation through voltage control are calculated on the basis of the detected brightness information.

In Step #3, the motor 8 is rotated forwardly to start opening the shutter blade assembly. In Step #4, counting is executed of the number of pulses which are formed as position detection signals on the basis of the state of rotation of the shutter plate 21, detected by the photointerrupter 12, which serves as a shutter-blade-assembly opening member. In Step #5, it is determined whether the resultant count has reached the first aperture value obtained in Step #2. Subsequently, full energization of the motor 8 is continued until the count reaches the first aperture value. When the shutter aperture diameter reaches the first aperture value, the process proceeds to Steps #6 and #7, where the control is passed to constant-speed control utilizing voltage control, as in the case of Step #8. The constant-speed control is continued until the second aperture value is reached, and the shutter opening operation is completed in Steps #8 and #9.

The above-described full energization operation and the constant-speed control utilizing the voltage control as well as the other operations are similar to those carried out in the above-described embodiment except that the end of each operation is given as a corresponding aperture value.

Figure 13:
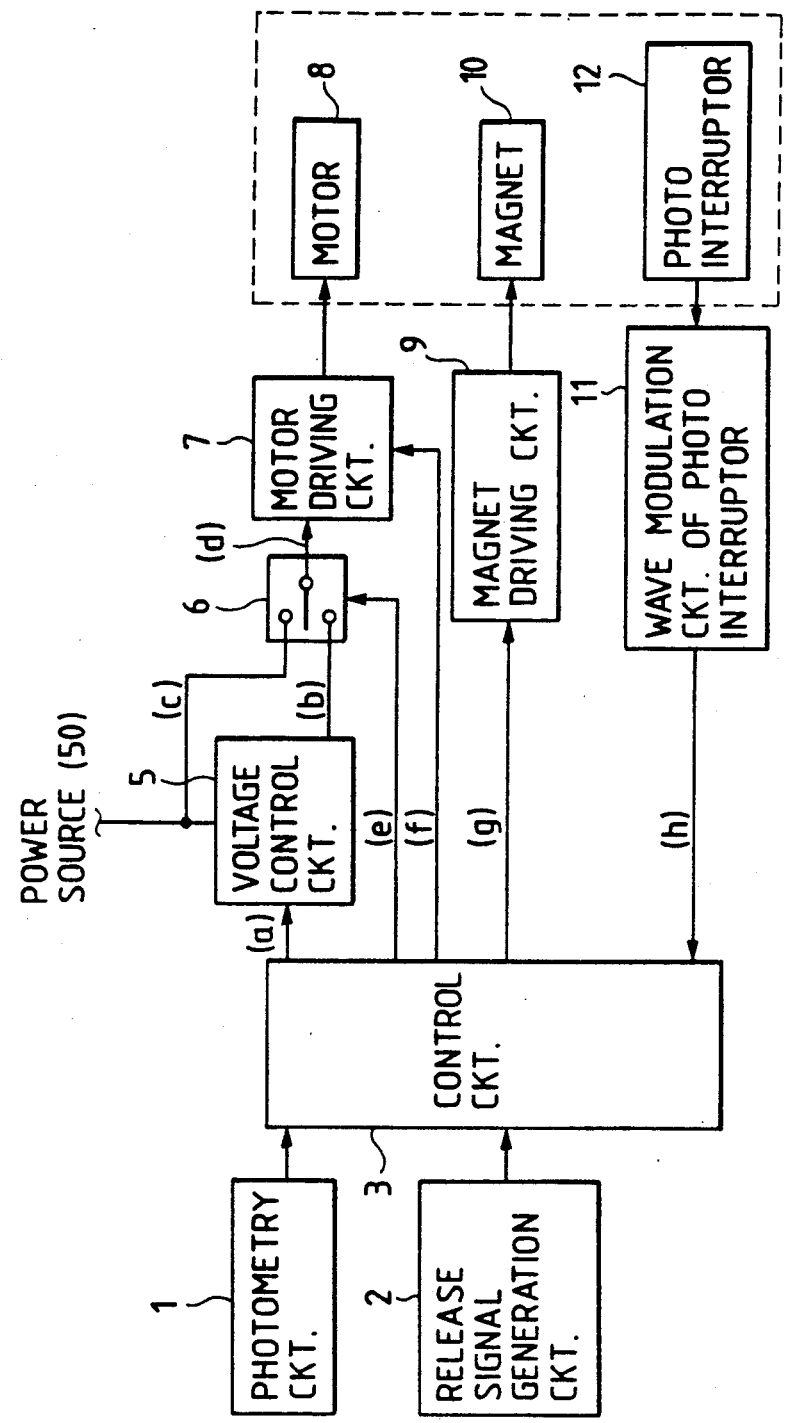
FIG. 13 is a flowchart showing another embodiment of the present invention.
Figure 14B:
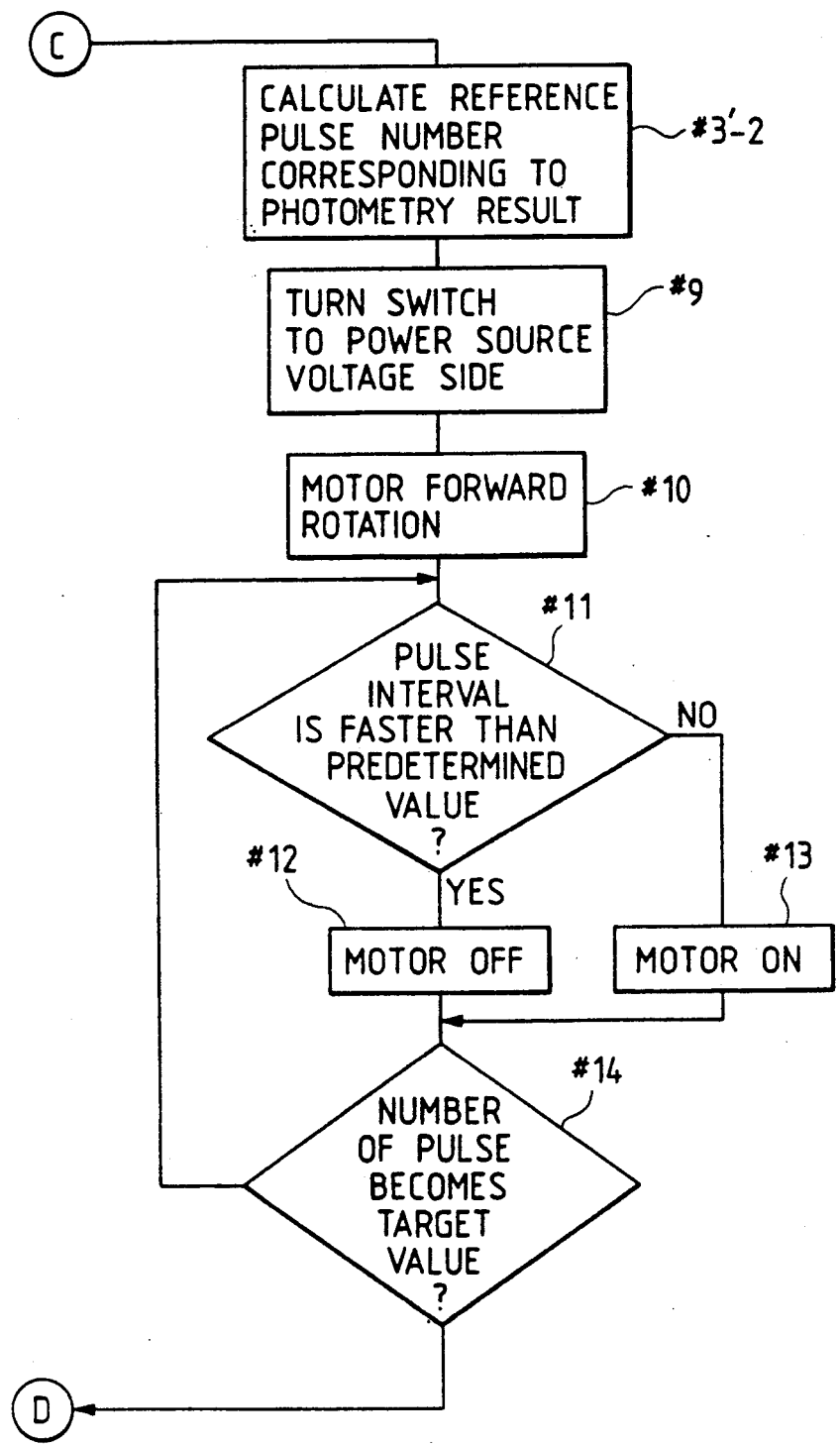

FIG. 13 is a block diagram showing a circuit arrangement according to a fourth embodiment of the present invention, and the illustrated circuit operates in accordance with the flow chart shown in FIG. 14. The mechanical structure of a partly-open type shutter apparatus according to the fourth embodiment is shown in FIG. 5 in schematic exploded form. The embodiment shown in FIG. 13 has substantially the same arrangement as the embodiment of FIG. 1 except that the voltage detection circuit 4 is eliminated from the embodiment of FIG. 1.

The operation of the fourth embodiment will now be described with reference to the flowchart of FIG. 14.

When the release switch is depressed, the release signal generation circuit 2 transmits a release signal to the control circuit 3.

In accordance with the input release signal, the control circuit 3 drives the photometry circuit 1 to detect brightness information on an object (Step #1'). On the basis of the brightness information and the sensitivity of the film used, the control circuit 3 calculates an Ev value for photography. In Step #2', on the basis of the Ev value, it is determined whether the shutter opening operation should be placed under constant-speed control utilizing constant-voltage control provided by the voltage control circuit 5 or under constant-speed control provided by applying a power source voltage directly to the motor driving circuit 7 to switch on and off the motor 8. This decision may be made, for example, by a comparison between the aforesaid Ev value and a predetermined threshold.

Then, in Step #3'-1 or #3'-2, the number of reference pulses corresponding to the optimum aperture diameter of the shutter blade assembly is calculated on the basis of the aforesaid Ev value.

If it is determined by such a comparison that the shutter opening speed should be placed under constant-speed control based on the voltage supplied from the voltage control circuit 5, the control circuit 3 outputs the switching signal (e) (Step #2) to connect the selection switch 6 to the voltage control circuit side (the lower-contact side shown in FIG. 13) which corresponds to the first circuit. In contrast, if it is determined that the shutter opening speed should be placed under constant-speed control utilizing the direct application of a power source voltage, the process proceeds to Step #9, where the control circuit 3 connects the selection switch 6 to the power source side (the upper-contact side shown in FIG. 1) which corresponds to the second circuit.

After the above-described setting has been completed, the control circuit 3 executes steps subsequent to Step #3 or #9. The operations of each of the steps are the same as those explained in connection with the flowchart of FIG. 4 described above, and explanation thereof is therefore omitted.

Figure 15:
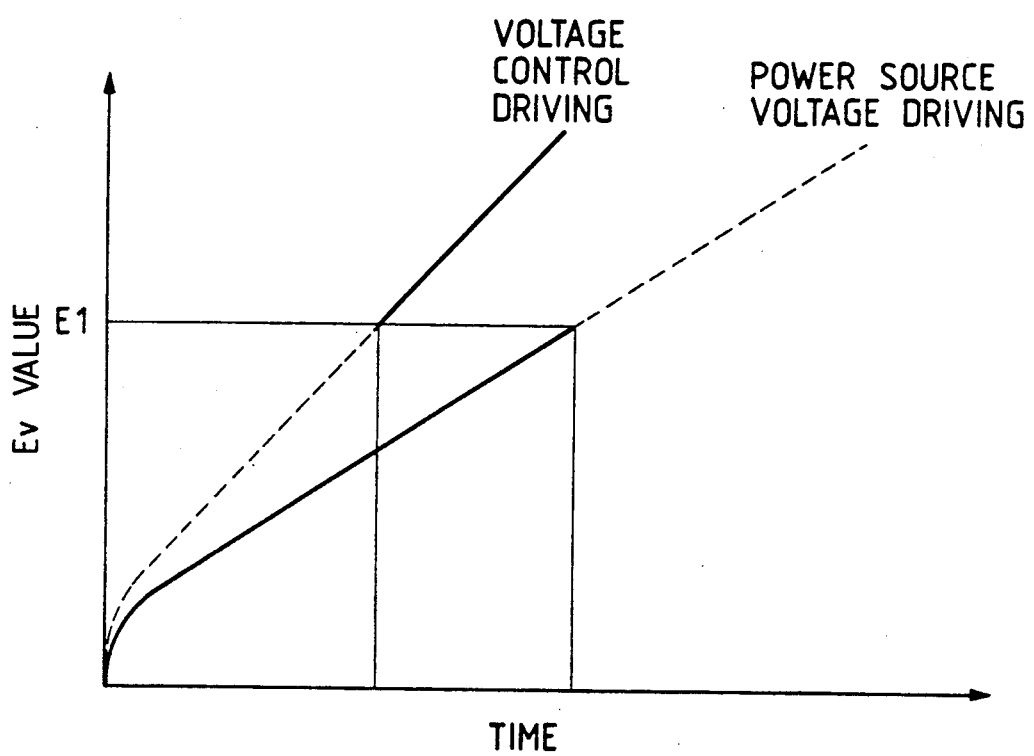
FIG. 15 is a waveform diagram illustrating operations according to the flow of FIG. 14.
Figure 16:
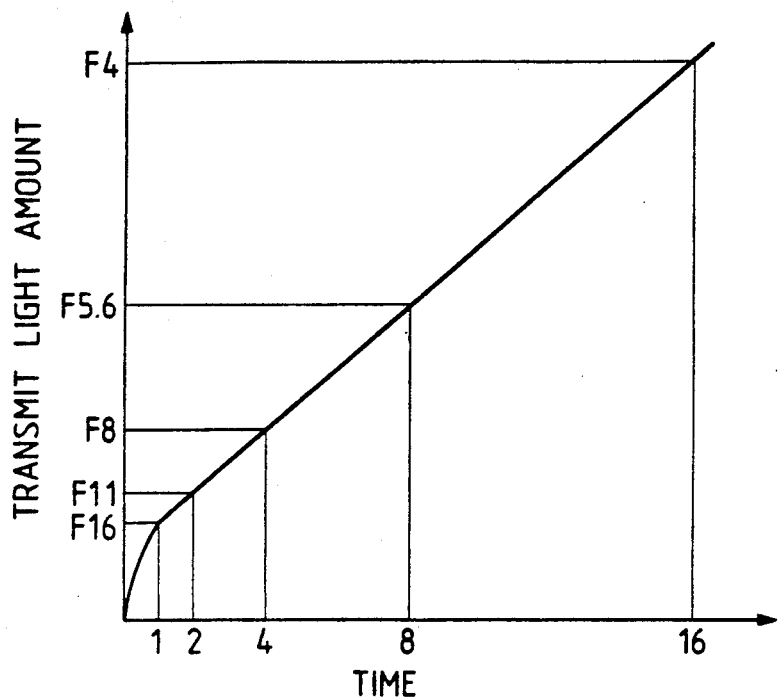
FIG. 16 is a graphic representation showing the relationship between the operation of a shutter and the amount of transmitted light.
Figure 17:
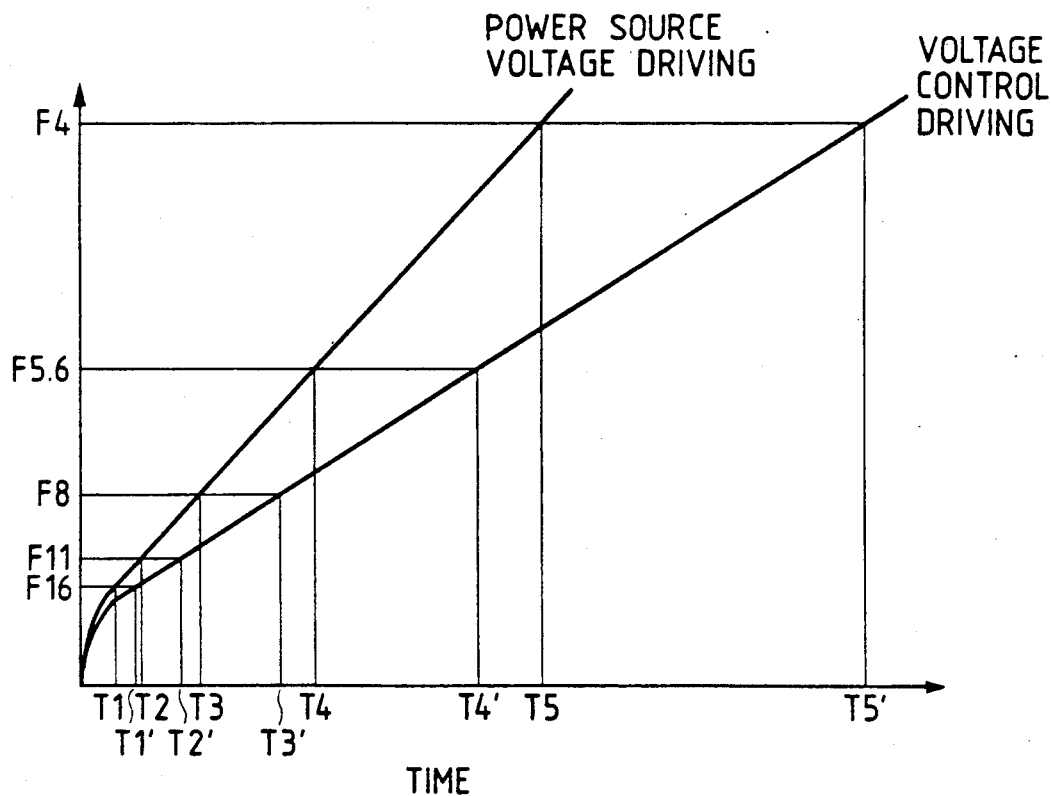
FIG. 17 is a waveform diagram showing running characteristics based on different shutter control modes.

FIG. 15 is a graphic representation showing the relationship between the aforesaid Ev value utilized in the shutter opening control executed in the fourth embodiment and the time required to open the shutter blade assembly. In the relationship of FIG. 15 between a threshold shown as $E_1$ and the Ev value detected from the photometry circuit 1, if the detected Ev value is smaller then E (the lower curve shown in FIG. 1), a power source voltage is directly applied to a motor driving means to switch on and off the motor 8, thereby providing constant-speed control. In contrast, if the detected Ev value is larger than $E_1$ (the upper curve shown in FIG. 1), a voltage is applied to the motor driving means through the voltage control means 5, thereby providing constant-speed control utilizing voltage control.

In the above-described Step #2′, the Ev value obtained in Step #1′ is compared with $E_1$, and if the Ev value is greater than $E_1$, the process proceeds to Step #3′-1, while if the Ev value is smaller than $E_1$, the process proceeds to Step #3′-2.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

We claim:

1. A shutter apparatus provided with a shutter which serves as a diaphragm and which is arranged to gradually increase an aperture diameter while proceeding from an initial state to another operating state, comprising:
   (a) a driving circuit for driving said shutter member;
   (b) a control circuit for controlling an electrical power to be supplied to said driving circuit, said control circuit having a first control mode for controlling the level of said electrical power and a second control mode for intermittently supplying said electrical power to said driving circuit and for controlling the operation for intermittently supplying said electrical power; and
   (c) a switching circuit arranged to detect the state of an output level of an power source circuit and selectively switch said control circuit from one mode to another.

2. A shutter apparatus according to claim 1, wherein said switching circuit selects said first control mode if the output level of said power source circuit is higher than a predetermined value and selects said second control mode if said output level is lower than said predetermined value.

3. A shutter apparatus according to claim 2, wherein said control circuit includes a constant-voltage circuit for maintaining the output voltage of said power source circuit at a constant level, said control circuit controlling the level of said voltage maintained at said constant level by said constant-voltage circuit in said first control mode, and supplying said output voltage of said power source circuit to said driving circuit in said second control mode.

4. A shutter apparatus according to claim 1, further comprising detecting means for detecting the driving speed of a shutter member which constitutes a part of said shutter, said control circuit executing control for either of said modes on the basis of an output from said detecting means.

5. A shutter apparatus according to claim 4, wherein said control circuit executes control of said electrical power in each of said modes so as to maintain the driving speed of said shutter member at a constant speed.

6. A shutter apparatus provided with a shutter which serves as a diaphragm and which is arranged to gradually increase an aperture diameter while proceeding from an initial state to another operating state, comprising:
   (a) a driving circuit for driving said shutter member;
   (b) a control circuit for controlling an electrical power to be supplied to said driving circuit, said control circuit having a first control mode in which an adjustment of electrical power to set the running speed of said shutter member at a predetermined speed and a second control mode in which said control for setting said running speed of said shutter member to said predetermined speed is not executed; and
   (c) a switching circuit arranged to set said control circuit to said second control mode in an initial period of the running operation of said shutter member and subsequently to change said control circuit to said first control mode.

7. A shutter apparatus according to claim 6, wherein said control circuit includes a constant-voltage circuit for maintaining the output voltage of said power source circuit at a constant level, said control circuit controlling the level of said voltage maintained at said constant level by said constant-voltage circuit in said first control mode, and supplying said output voltage of said power source circuit to said driving circuit in said second control mode.

8. A shutter apparatus according to claim 6, further comprising detecting means for detecting the driving speed of said shutter member, said electrical power being controlled on the basis of an output from said detecting means in said first control mode.

9. A shutter apparatus according to claim 6, wherein said switching circuit includes a timer circuit and causes said control circuit to operate in said second control mode during a time based on an output from a photometry circuit.

10. A shutter apparatus according to claim 9, wherein said timer circuit is set so as to reduce the time during which control is executed in said second control mode as said output from said photometry circuit indicates higher brightness.

11. A shutter apparatus according to claim 6, wherein said control circuit supplies a constant level of electrical power to said driving circuit in said second control mode.

12. A shutter apparatus according to claim 11, wherein said control circuit supplies a predetermined constant electrical power according to a photometric output to said driving circuit in said second control mode.

13. A shutter apparatus according to claim 6, wherein said switching circuit detects a variation of aperture value with the running of said shutter member and keeps said control being controlled in said second control mode until said aperture value reaches a predetermined aperture value.

14. A shutter apparatus according to claim 13, wherein said predetermined aperture value is determined on the basis of said photometric output.

15. A shutter apparatus provided with a shutter which serves as a diaphragm and which is arranged to gradually increase an aperture diameter while proceeding from an initial state to another operating state, comprising:

(a) a driving circuit for driving said shutter member;
(b) a control circuit for controlling an electrical power to be supplied to said driving circuit, said control circuit having a first control mode for controlling the level of said electrical power and a second control mode for intermittently supplying said electrical power to said driving circuit and for controlling the operation for intermittently supplying said electrical power; and
(c) a switching circuit for selectively switching said control circuit from one mode to another in accordance with the state of brightness.

16. A shutter apparatus according to claim 15, wherein said switching circuit selects said second control mode when said brightness is lower than a predetermined level of brightness.

17. A shutter apparatus according to claim 15, wherein said control circuit includes a constant-voltage circuit for maintaining the output voltage of said power source circuit at a constant level, said control circuit controlling the level of said voltage maintained at said constant level by said constant-voltage circuit in said first control mode, and supplying said output voltage of said power source circuit to said driving circuit in said second control mode.

18. A shutter apparatus according to claim 15, further comprising detecting means for detecting the driving speed of a shutter member which constitutes a part of said shutter, said control circuit executing control for either of said modes on the basis of an output from said detecting means.

19. A shutter apparatus according to claim 18, wherein said control circuit executes control of said electrical power in each of said modes so as to maintain the driving speed of said shutter member at a constant speed.

20. A camera provided with a shutter which serves as a diaphragm and which is arranged to gradually increase an aperture diameter while proceeding from an initial state to another operating state, comprising:

(a) a driving circuit for driving said shutter member;
(b) a control circuit for controlling an electrical power to be supplied to said driving circuit, said control circuit having a first control mode for controlling the level of said electrical power and a second control mode for intermittently supplying said electrical power to said driving circuit and for controlling the operation of intermittently supplying said electrical power; and
(c) a switching circuit arranged to detect the state of an output level of an power source circuit and selectively switch said control circuit from one mode to another.

21. A camera provided with a shutter which serves as a diaphragm and which is arranged to gradually increase an aperture diameter while proceeding from an initial state to another operating state, comprising:

(a) a driving circuit for driving said shutter member;
(b) a control circuit for controlling an electrical power to be supplied to said driving circuit, said control circuit having a first control mode in which an adjustment of electrical power to set the running speed of said shutter member at a predetermined speed and a second control mode in which said control for setting said running speed of said shutter member to said predetermined speed is not executed; and
(c) a switching circuit arranged to set said control circuit to said second control mode in an initial period of the running operation of said shutter member and subsequently to pass said control circuit to said first control mode.

22. A camera provided with a shutter which serves as a diaphragm and which is arranged to gradually increase an aperture diameter while proceeding from an initial state to another operating state, comprising:

(a) a driving circuit for driving said shutter member;
(b) a control circuit for controlling an electrical power to be supplied to said driving circuit, said control circuit having a first control mode for controlling the level of said electrical power and a second control mode for intermittently supplying said electrical power to said driving circuit and for controlling the operation of intermittently supplying said electrical power; and
(c) a switching circuit for selectively switching said control circuit from one mode to another in accordance with the state of brightness.

23. A camera provided with a shutter which serves as a diaphragm and which is arranged to gradually increase an aperture diameter while proceeding from an initial state to another operating state, comprising:

(a) a driving circuit for driving said shutter member;
(b) a control circuit for controlling an electrical power to be supplied to said driving circuit, said control circuit having a first control mode for controlling the level of said electrical power and a second control mode for intermittently supplying said electrical power to said driving circuit and for controlling the operation of intermittently supplying said electrical power; and
(c) a switching circuit arranged to determine and switch said control circuit from one mode to another by taking into account a factor relative to the operating state of said camera.

* * * * *

UNITED STATES PATENT AND TRADEMARK OFFICE
CERTIFICATE OF CORRECTION

PATENT NO. : 5,079,583
DATED : January 7, 1992
INVENTOR(S) : Yoshinobu Sato, et al.

It is certified that error appears in the above-identified patent and that said Letters Patent is hereby corrected as shown below:

| | |
|---|---|
| Col. 1, line 46. | Change "quality" to -- quantity -- |
| Col. 1, line 52. | Change "an" to -- a -- |
| Col. 1, line 57. | Change "imperfectly" to -- inadequately -- |
| Col. 3, line 3. | Change "into" to -- of -- |
| Col. 4, line 48. | After "the" insert -- control flow of the -- |
| Col. 4, line 67. | After "showing" insert -- the control flow of -- |
| Col. 5, line 33. | Change "e.g." to -- e.g., -- |
| Col. 5, line 43. | Change "an" to -- a -- |
| Col. 6, line 19. | Change "party" to -- partly -- |
| Col. 6, lines 37, 53, 57. | Change "FIG. 1." to -- FIG. 5. -- |
| Col. 9, line 36. | Change "make fast" to -- increase -- |
| Col. 10, line 15. | Delete "the" |
| Col. 10, line 68. | Change "e.g." to -- e.g., -- |
| Col. 11, line 12. | Change "an" to -- a -- |
| Col. 11, line 14. | Change "as to" to -- that -- |
| Col. 13, line 37. | After "well" insert -- as -- |
| Col. 15, line 2. | Change "E" to -- $E_1$ -- |
| Col. 15, line 17. | Change "is" to -- are -- |
| Col. 15, line 43. | Change "an" to -- a -- |
| Col. 16, line 12. | After "power" insert -- is made -- |

UNITED STATES PATENT AND TRADEMARK OFFICE
CERTIFICATE OF CORRECTION

PATENT NO. : 5,079,583

DATED : January 7, 1992

INVENTOR(S) : Yoshinobu Sato, et al.

It is certified that error appears in the above-identified patent and that said Letters Patent is hereby corrected as shown below:

Col. 18, line 11, After "power" insert --,--,

Signed and Sealed this

Seventeenth Day of August, 1993

Attest:

BRUCE LEHMAN

*Attesting Officer*  *Commissioner of Patents and Trademarks*